US012709245B2

(12) United States Patent
Asai et al.

(10) Patent No.: US 12,709,245 B2
(45) Date of Patent: Aug. 18, 2026

(54) USER AUTHENTICATION METHOD, USER AUTHENTICATION DIGITAL KEY SYSTEM, AND MOBILE DEVICE PROGRAM PRODUCT

(71) Applicant: DENSO CORPORATION, Kariya City (JP)

(72) Inventors: Kentaro Asai, Kariya City (JP); Hideshi Togawa, Kariya City (JP); Suguru Matsushita, Kariya City (JP); Koji Sakamoto, Kariya City (JP)

(73) Assignee: DENSO CORPORATION, Kariya (JP)

( * ) Notice: Subject to any disclaimer, the term of this patent is extended or adjusted under 35 U.S.C. 154(b) by 28 days.

(21) Appl. No.: 19/041,280

(22) Filed: Jan. 30, 2025

(65) Prior Publication Data

US 2025/0170988 A1 May 29, 2025

Related U.S. Application Data

(63) Continuation of application No. PCT/JP2023/025564, filed on Jul. 11, 2023.

(30) Foreign Application Priority Data

Aug. 4, 2022 (JP) ................................ 2022-124932

(51) Int. Cl.
*B60R 25/24* (2013.01)
*B60R 25/01* (2013.01)
(Continued)

(52) U.S. Cl.
CPC .............. *B60R 25/24* (2013.01); *B60R 25/01* (2013.01); *G07C 9/00309* (2013.01); *G07C 9/22* (2020.01);
(Continued)

(58) Field of Classification Search
CPC ... B60R 25/24; B60R 25/01; B60R 2325/101; B60R 2325/103; B60R 2325/205;
(Continued)

(56) References Cited

U.S. PATENT DOCUMENTS 8,508,760 B2 * 8/2013 Sahashi ................ G06F 21/608 358/1.14
10,659,457 B2 * 5/2020 Ito ....................... H04W 12/065
(Continued)

FOREIGN PATENT DOCUMENTS

JP 2016110368 A 6/2016
JP 2017005712 A 1/2017
(Continued)

*Primary Examiner* — Mohamed Barakat
(74) *Attorney, Agent, or Firm* — Harness, Dickey & Pierce, P.L.C.

(57) ABSTRACT

The mobile device performs a second communication with a key module when the key module is overlapped on the mobile device. The mobile device performs a first communication with the authentication unit. The mobile device transmits a challenge code, which is transmitted from the authentication unit, to the key module via the second communication. Upon receiving the challenge code from the mobile device, the key module generates a response code using the vehicle key code stored in a local storage, transmits the generated response code to the mobile device. The authentication unit performs user authentication using the response code.

19 Claims, 10 Drawing Sheets

(51) Int. Cl.
*G07C 9/00* (2020.01)
*G07C 9/22* (2020.01)

(52) U.S. Cl.
CPC ... *B60R 2325/101* (2013.01); *B60R 2325/103* (2013.01); *B60R 2325/205* (2013.01); *G07C 2009/00793* (2013.01); *G07C 2009/00976* (2013.01); *G07C 2209/08* (2013.01); *G07C 2209/63* (2013.01)

(58) Field of Classification Search
CPC .................. G07C 9/00309; G07C 9/22; G07C 2009/00793; G07C 2009/00976; G07C 2209/08; G07C 2209/63
See application file for complete search history.

(56) References Cited

U.S. PATENT DOCUMENTS

2004/0019787 A1* 1/2004 Shibata ................. H04L 63/045 713/168
2010/0325713 A1* 12/2010 Kurita ................... H04L 9/3273 726/3
2016/0364704 A1 12/2016 Salgado
2017/0349146 A1* 12/2017 Krishnan .............. B60R 25/307
2019/0149990 A1* 5/2019 Wang ................ H04W 12/0471 370/329
2021/0061223 A1 3/2021 Fuke
2021/0203658 A1* 7/2021 Ohashi .................. H04W 12/63
2021/0327177 A1* 10/2021 Kirkjan .............. G07C 9/00817
2022/0386118 A1* 12/2022 Kim ...................... H04L 9/0841

FOREIGN PATENT DOCUMENTS

JP 2020100994 A 7/2020
JP 2020147926 A 9/2020
JP 2021037889 A 3/2021
JP 2021147959 A 9/2021
JP 2021147960 A 9/2021

* cited by examiner

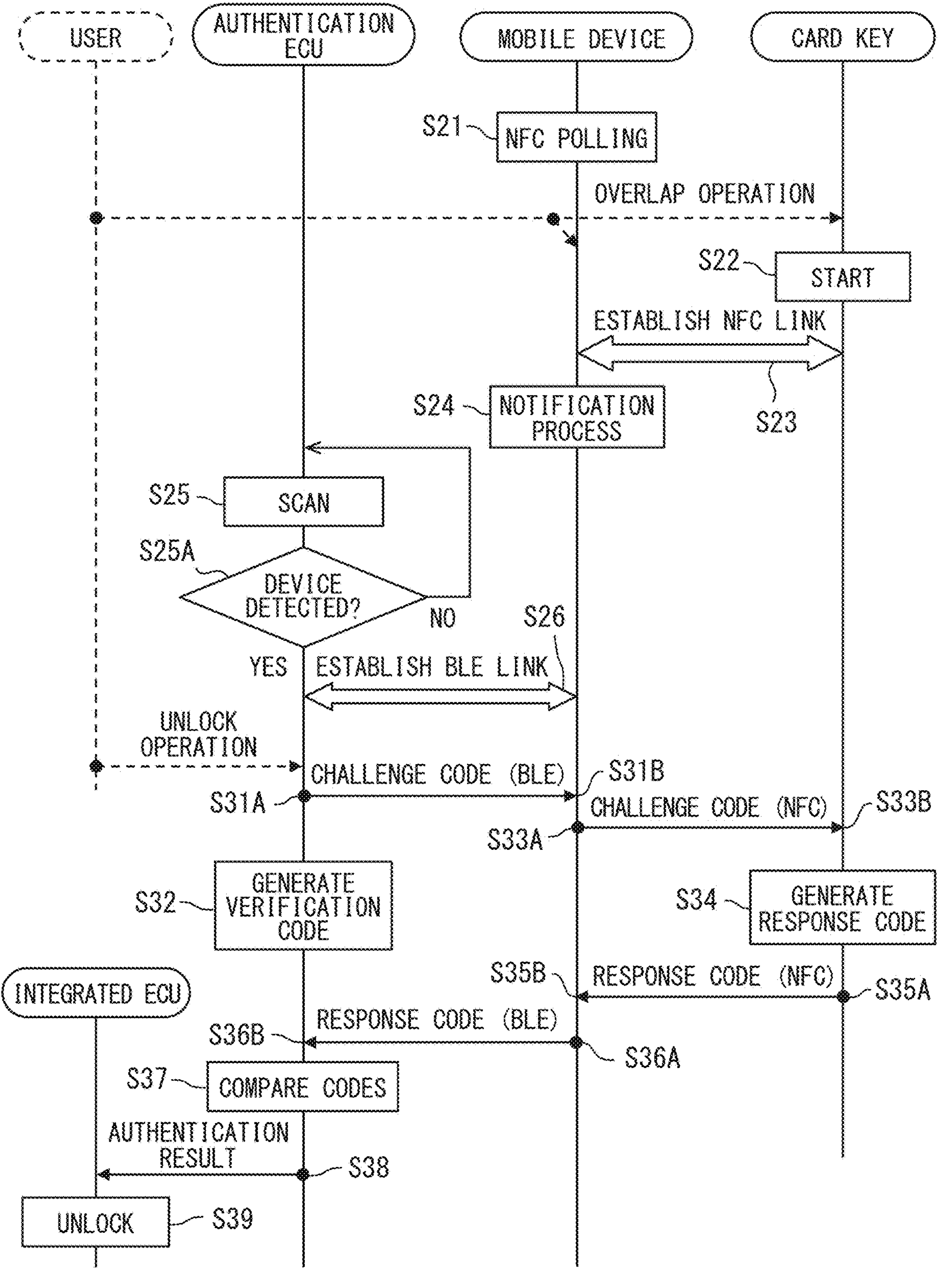
FIG. 6
USER
AUTHENTICATION ECU
MOBILE DEVICE
CARD KEY
S21
NFC POLLING
OVERLAP OPERATION
S22
START
ESTABLISH NFC LINK
S23
S24
NOTIFICATION PROCESS
S25
SCAN
S25A
DEVICE DETECTED?
NO
YES
S26
ESTABLISH BLE LINK
UNLOCK OPERATION
CHALLENGE CODE (BLE)
S31A
S31B
CHALLENGE CODE (NFC)
S33A
S33B
S32
GENERATE VERIFICATION CODE
S34
GENERATE RESPONSE CODE
INTEGRATED ECU
S35B
RESPONSE CODE (NFC)
S35A
RESPONSE CODE (BLE)
S36B
S36A
S37
COMPARE CODES
AUTHENTICATION RESULT
S38
UNLOCK
S39

USER AUTHENTICATION METHOD, USER AUTHENTICATION DIGITAL KEY SYSTEM, AND MOBILE DEVICE PROGRAM PRODUCT

CROSS REFERENCE TO RELATED APPLICATIONS

The present application is a continuation application of International Patent Application No. PCT/JP2023/025564 filed on Jul. 11, 2023, which designated the U.S. and claims the benefit of priority from Japanese Patent Application No. 2022-124932 filed on Aug. 4, 2022. The entire disclosures of all of the above applications are incorporated herein by reference.

TECHNICAL FIELD

The present disclosure relates to a technique for authenticating a user via a wireless communication between a vehicle and a mobile device.

BACKGROUND

Conventionally, in a vehicle system, a vehicle authenticates a mobile device using a token (one-time key code) issued by a server, and performs a vehicle control, such as unlocking or locking, in response to the authentication succeeds.

SUMMARY

The present disclosure provides a user authentication method. The user authentication method is performed by an authentication unit, a digital key application installed in a mobile device, and a key module. The mobile device is capable of performing a first communication, which is a wireless communication method having a communication distance of 0.5 meters or longer, and a second communication, which is a wireless communication method having a communication distance shorter than the communication distance of the first communication. The user authentication method includes transmitting, from the authentication unit, first data for authenticating a user, to the digital key application installed in the mobile device by performing the first communication. The authentication unit is configured to perform the first communication with the mobile device and includes a first storage device in which a first key code for authenticating the user is stored. The user authentication method includes acquiring, by the digital key application, second data from a key module by performing the second communication with the key module in response to the first data being received by the digital key application via the first communication. The key module is configured to perform the second communication with the mobile device and includes a second storage device in which a second key code is stored. The second key code has a value same as a value of the first key code or the second key code is associated with the first key code. The key module generates the second data based on the first data using the second key code stored in the second storage device. The user authentication method includes transmitting, by the digital key application, the second data to the authentication unit by performing the first communication with the authentication unit, and authenticating, by the authentication unit, the user using the second data transmitted from the digital key application.

BRIEF DESCRIPTION OF DRAWINGS

Objects, features and advantages of the present disclosure will become apparent from the following detailed description made with reference to the accompanying drawings. In the drawings:

FIG. 6 is a sequence diagram showing an operation of each device when a user unlocks a vehicle using BLE authentication;

DETAILED DESCRIPTION

Figure 1:
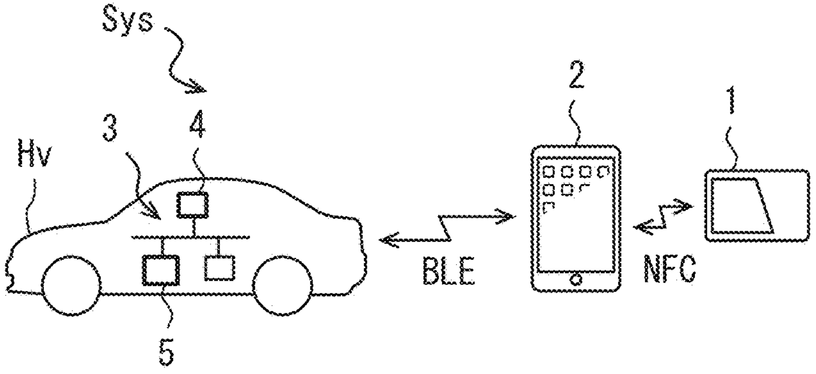
FIG. 1 is a diagram showing an overall view of a digital key system applied to a vehicle.

In a related art, a vehicle authenticates a mobile device using a token (one-time key code) issued by a server, and performs vehicle control, such as unlocking or locking of the vehicle in response to the authentication of vehicle is succeeded. The mobile device may be a smartphone carried by a user, and is capable of connecting to the Internet. The mobile device can be used as a vehicle key. Thus, a user may use the mobile device instead of a dedicated electronic key of the vehicle, and there is no need to carry the dedicated electronic key, thereby increasing a convenient for operating the vehicle.

In a smart entry system according to another related art, a mobile device can be used as a dedicated key by storing a static key code in the mobile device. The static key code is a fixed key code, which is different from the one-time key code. In a smart entry system, a dedicated key or a mobile device automatically performs an authentication process by performing a wireless communication with an in-vehicle device, thereby allowing the user to control the vehicle, such as locking or unlocking the door. Thus, the user can control the vehicle without operating the dedicated key or the mobile device. This kind of system is also referred to as a Passive Entry/Passive Start (PEPS) system.

In the above described authentication system that uses the one-time key code, a server needs to manage the one-time key code and distribute the one-time key code to the mobile device. Thus, server maintenance and cost thereof is necessary. In the above described smart entry system, the static key, which is a reusable key code, is stored in the mobile device. Thus, regular updates of the security software of the mobile device is required to prevent the key code from being stolen by hacking. That is, in a configuration where the key code is stored in the smartphone, cost for ensuring security of the smartphone is necessary.

According to an aspect of the present disclosure, a user authentication method includes: transmitting, from an authentication unit, first data for authenticating a user, to a digital key application installed in a mobile device by performing a first communication, wherein the authentication unit is configured to perform the first communication with the mobile device and including a first storage device in which a first key code for authenticating the user is stored, the mobile device is installed with the digital key application and is configured to perform the first communication, which is a wireless communication method having a communication distance of 0.5 meters or longer, and a second communication, which is a wireless communication method having a communication distance shorter than the communication distance of the first communication; acquiring, by the digital key application, second data from a key module by performing the second communication with the key module in response to the first data being received by the digital key application via the first communication, wherein the key module is configured to perform the second communication with the mobile device and includes a second storage device in which a second key code is stored, the second key code has a value same as a value of the first key code or the second key code is associated with the first key code, and the key module generates the second data based on the first data using the second key code stored in the second storage device; transmitting, by the digital key application, the second data to the authentication unit by performing the first communication with the authentication unit; and authenticating, by the authentication unit, the user using the second data transmitted from the digital key application.

In the above configuration, the mobile device functions as a device that relays the communication between the key module and the authentication unit. Since the key code is not stored in the mobile device, a risk of the key code being leaked can be reduced even if the mobile device is lost or hacked. In the above configuration, the key code on user side is stored in the key module. Thus, a server for storing a digital key can be omitted. Thus, it is possible to reduce a cost for maintaining the system while ensuring the security.

According to another aspect of the present disclosure, a user authentication digital key system includes: a digital key application installed in a mobile device, which is capable of performing a first communication and a second communication, the first communication being a wireless communication method having a communication distance of 0.5 meters or longer, and the second communication being a wireless communication method having a communication distance shorter than the communication distance of the first communication; and a key module configured to communicate with the mobile device via the second communication. The digital key application includes: a first data receiving unit receiving first data, which is transmitted from an authentication unit, via the first communication for user authentication purpose; and a first data transmission unit transmitting a data set including the first data to the key module via the second communication in response to the first data being received by the first data receiving unit via the first communication. The key module includes: a module storage unit in which a key code for user authentication purpose is stored; and a response circuit generating second data based on the first data using the key code stored in the module storage unit in response to the first data transmitted from the digital key application being received via the second communication, and the response circuit returning the generated second data to the digital key application via the second communication. The digital key application further includes: a second data receiving unit receiving the second data returned from the key module via the second communication; and a second data transmission unit transmitting the second data to the authentication unit via the first communication.

The user authentication digital key system includes, as elements, the mobile device and the key module, which perform the above-described user authentication method. Similar to the above-described user authentication method, the user authentication digital key system can reduce the cost for maintaining the system while ensuring the security.

According to another aspect of the present disclosure, a mobile device program product stored in a computer-readable non-transitory storage medium is provided. The mobile device program product includes instructions to be executed by at least one processor included in a mobile device for performing authentication of a user. The instructions includes: receiving first data, which is transmitted from an authentication unit, via a first communication for user authentication, wherein the mobile device is capable of performing the first communication, which is a wireless communication method having a communication distance of 0.5 meters or longer, and a second communication, which is a wireless communication method having a communication distance shorter than the communication distance of the first communication; in response to receiving the first data transmitted from the authentication unit via the first communication, performing the second communication with a key module, in which a key code used for the user authentication is stored, to acquire the key code; generating second data based on the first data using the acquired key code; and transmitting the second data to the authentication unit via the first communication.

The mobile device program product is a software program for causing a general mobile device, which is capable of performing the first communication and the second communication, to function as a mobile device that performs the above-described user authentication method.

In the present disclosure, installation of digital key server, which is a server that manages the key code or vehicle operation, is an optional configuration. However, the present disclosure should not be understood as prohibiting an installation of the digital key server. The present disclosure is also applicable to a system, which includes a digital key server and an authentication method using the digital key server.

The following will describe an embodiment of the present disclosure with reference to the drawings. FIG. 1 is a diagram showing an example of a schematic configuration of a vehicle digital key system Sys. As shown in FIG. 1, the digital key system Sys applied to a vehicle Hv includes a card key 1, a mobile device 2, and an in-vehicle system 3. The in-vehicle system 3 includes sensors, a motor, and an ECU (Electronic Control Unit), which are mounted on the vehicle Hv. The in-vehicle system 3 controls a state (locked state or unlocked state) of locking mechanism of the vehicle Hv. The in-vehicle system 3 includes an authentication ECU 4 and an integrated ECU 5.

The vehicle Hv may be a four-wheeled automobile owned by an individual. A user in the present disclosure may be the owner of the vehicle Hv or a family member of the owner of the vehicle Hv. The vehicle Hv may be an electric vehicle that can be charged with external power source, such as a plug-in hybrid vehicle. The concept of electric vehicles include electric vehicles, hybrid vehicles, and fuel cell vehicles. The hybrid vehicle is a vehicle including an engine and a motor, as power sources. In another embodiment, the vehicle Hv may be an engine vehicle. In the following description, front-rear, left-right, and up-down directions are basically defined with respect to the vehicle Hv when there is no special definition for a reference direction.

The mobile device 2 and the authentication ECU 4 each is capable of performing BLE communication, which is wireless communication conforming to Bluetooth (registered trademark) Low Energy (hereinafter, referred to as BLE). In the present disclosure, a BLE signal refers to a wireless signal that complies with the BLE standard. The mobile device 2 and the authentication ECU 4 are paired with one another according to the BLE standard. The mobile device 2 is able to communicate with the authentication ECU 4 when the mobile device is located within a communication area of the authentication ECU 4.

The following will describe a case where the authentication ECU 4 functions as a master in the communication between the authentication ECU and the mobile device 2, and the mobile device 2 functions as a slave. In response to receiving an advertisement packet from the mobile device 2, the authentication ECU 4 establishes a communication connection with the mobile device 2, and detects a presence of the mobile device 2 (that is, a user) in the vicinity of the vehicle Hv. The advertisement packet is a signal for notifying (i.e., advertisement) another device of its own presence. In another embodiment, the mobile device 2 may be configured to operate as a master in communication with the authentication ECU 4.

The mobile device 2 and the card key 1 are configured to be capable of performing a near field communication (NFC). NFC refers to a communication over a distance of several centimeters to approximately 10 centimeters. NFC is also referred to as a non-contact communication, a touch communication, a near-contact communication, an ultra-short distance communication, etc. NFC has a communication distance, which is substantially shorter than a communication distance of BLE communication. A communication method in which the communication distance is substantially shorter compared with another communication method refers to a communication method in which the communication distance is 1/10 or less of another communication method. The NFC standard may be one of ISO/IEC 18092 (NFCIP-1), ISO/IEC 21481 (NFCIP-2), ISO/IEC 14443, or ISO/IEC 18092. The NFC may conform to the Type-F standard, or may conform to the Type-A standard or Type-B standard. The Type-F standard is a communication method defined in NFCIP-1, JIS X 6319-4, etc., and corresponds to a known FeliCa (registered trademark). The communication between the mobile device 2 and the card key 1 may be carried out using a secure element.

The mobile device 2 has a function as an NFC reader or an NFC writer, and attempts to establish a communication connection with the card key 1 by transmitting a polling command when a periodic event of a specific event occurs. The polling command is a command for checking whether the card key 1 is located within a communication range. When the card key 1 is located over a portion of the mobile device 2 where an antenna for NFC communication is arranged, such as a back surface of the mobile device 2, the mobile device 2 is able to communicate with the card key 1.

When performing the NFC communication with the card key 1, the mobile device 2 functions as a terminal that requests a return of data, that is, functions as a reader or an active device. The card key 1 functions as a passive device that returns a signal according to the contents of data transmitted from the mobile device 2. The card key 1 is activated by a receiving power of the signal transmitted from the mobile device 2, and generates and transmits a response signal.

(Card Key 1)

The card key 1 is an integrated circuit (IC) card, such as a credit card. The vehicle key code is registered in the IC card in advance. The card key 1 corresponds to a key module. The key module is an object, which is capable of performing the NFC communication with the mobile device 2 in which the vehicle key code is stored.

The vehicle key code in the present disclosure is a code functioning as an electronic key for using the vehicle Hv. The vehicle key code can be understood as data that the authentication ECU 4 uses to verify the legitimacy of the person attempting to operate the vehicle Hv, that is, to verify whether the person who attempts to operate the vehicle is a legitimate user. The vehicle key code has a predetermined length, such as 128 bits or 256 bits. The vehicle key code is different for each combination of the vehicle Hv and the card key 1. According to an aspect, the vehicle key code can be understood as a secret number, such as a password or a Personal Identification Number (PIN). The concept of number may also include a character string that combines letters or symbols instead of or together with the numbers. The vehicle key code may also be a code generated based on a credit card number. The vehicle key code may be a code generated by a hash function with a bit string, which is a combination of a credit card number and a validity period, as an input of the hash function.

The vehicle key code may be a value generated by a hash function with a combined value of the vehicle ID and the user ID as an input of the hash function. The vehicle ID is an identification number assigned to each vehicle, such as a vehicle identification number (VIN). The vehicle key code may be a password having a predetermined number of characters registered by the user, or a value generated by a predetermined hash function with the password as an input of the hash function.

The vehicle key code can be issued by the authentication ECU 4 based on a user operation on an in-vehicle HMI (Human Machine Interface). Writing the vehicle key code to the credit card may be performed by using the writer function of the NFC communication device provided in the in-vehicle system 3. The issuing of vehicle key code may be performed by the mobile device 2. The mobile device 2 may also be configured to be capable of writing the vehicle key code in a material of the key module, such as a credit card. Alternatively, the vehicle key code may be issued by a predetermined server and written to the credit card via the mobile device 2 or the authentication ECU 4. The vehicle key code is written in a memory included in the credit card, and the credit card functions as the card key 1 or key module of the present disclosure. The same vehicle key code as that registered in the card key 1 is also registered in the authentication ECU 4.

Figure 2:
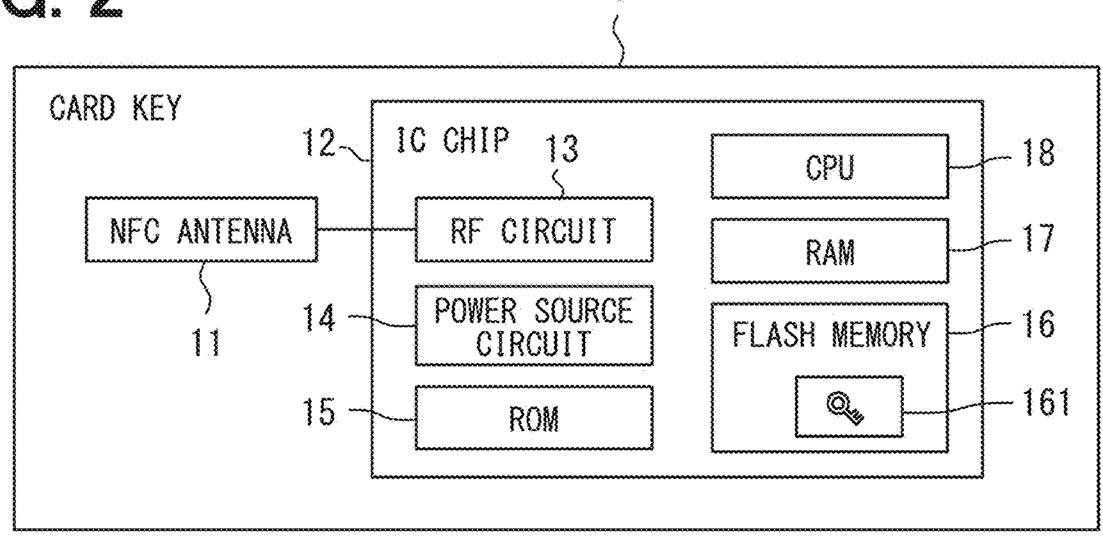
FIG. 2 is a block diagram showing a configuration of a card key.

As shown in FIG. 2, the card key 1 includes an NFC antenna 11 and an IC (Integrated Circuit) chip 12. The IC chip 12 includes a radio frequency circuit 13, a power source circuit 14, a read-only memory (ROM) 15, a flash memory

16, a random access memory (RAM) 17, and a central processing unit (CPU) 18. The IC chip 12 corresponds to a response circuit.

The NFC antenna 11 is a conductive element for receiving radio waves in the frequency band of NFC. The NFC antenna 11 is provided by a loop antenna or an antenna coil. The NFC antenna 11 is connected to the radio frequency circuit 13 of the IC chip 12. The NFC antenna 11 is used for transmitting and receiving data to and from the mobile device 2. The NFC antenna 11 supplies power to the IC chip 12 when receiving a signal transmitted from the mobile device 2.

The radio frequency circuit 13 is a circuit module that executes a process related to conversion from a baseband signal to a radio frequency signal and a conversion from a radio frequency signal to a baseband signal. The radio frequency in the present disclosure refers to a frequency band used in NFC, for example, 13.56 MHz. The radio frequency circuit 13 executes a reception process such as demodulation of radio frequency signal received by the NFC antenna 11, and outputs the demodulated signal to the CPU 18 as reception data. The radio frequency circuit 13 modulates data input from the CPU 18 and outputs the modulated data to the NFC antenna 11 for transmitting the modulated data using the wireless communication.

The power source circuit 14 is a circuit module that converts the power input from the NFC antenna 11 into a voltage suitable for driving the CPU 18 and the like. The ROM 15 is a read-only memory in which programs for the card key 1, such as an OS (Operating System) or applications, are stored. The flash memory 16 is a rewritable non-volatile storage device. The flash memory 16 includes an internal storage area 161, which is a memory area for storing the vehicle key code. The internal storage area 161 corresponds to a second storage device and a module storage unit. The vehicle key code stored in the internal storage area 161 of the card key 1 corresponds to a second key code. The RAM 17 is a rewritable volatile memory.

The CPU 18 is a calculation core that executes various calculation processes. The circuits of the card key 1, such as the CPU 18 are activated when the NFC antenna 11 receives an NFC signal, such as a polling command that has a signal strength equal to or higher than a predetermined value.

The CPU 18 executes a process for returning a response in response to the signal transmitted from the mobile device 2. Upon receiving a communication request from the mobile device 2, the CPU 18 performs communication of commands or data for communication connection or mutual authentication with the mobile device 2.

When the CPU 18 receives, from the mobile device 2, an NFC signal including a challenge code, the CPU 18 generates a response code based on the challenge code and the vehicle key code stored in the internal storage area 161 of the card key 1. The generation of response code by the CPU 18 is performed in the same manner, that is, using the same generation function as the generation of verification code by the authentication ECU 4. The generation of verification code by the authentication ECU 4 will be described later. The CPU 18 executes a process of returning the generated response code to the mobile device 2 by performing NFC. In response to receiving the challenge code, the card key 1 generates the response code by encrypting the received challenge code with the vehicle key code, and transmits the response code as a response signal. The challenge code and the response code may be transmitted and received in NFC Data Exchange Format (NDEF). The response code is a code that is submitted to the authentication ECU 4 to check the legitimacy of the user, and therefore may also be referred to as a submission authentication code. The response code corresponds to a second data.

(Mobile Device 2)

The mobile device 2 is a portable general-purpose information processing terminal equipped with BLE communication function and NFC function. The mobile device 2 may be a smartphone or a wearable device. A wearable device is a communication device that is worn by a user when in use. The wearable device may be in various forms, such as a wristband type, a watch type, a ring type, glasses type, or an earphone type. The mobile device 2 of the present disclosure may be implemented in separated form. For example, the mobile device 2 may be implemented by a main device, such as a smartphone and a sub device, such as a wearable device.

Figure 3:
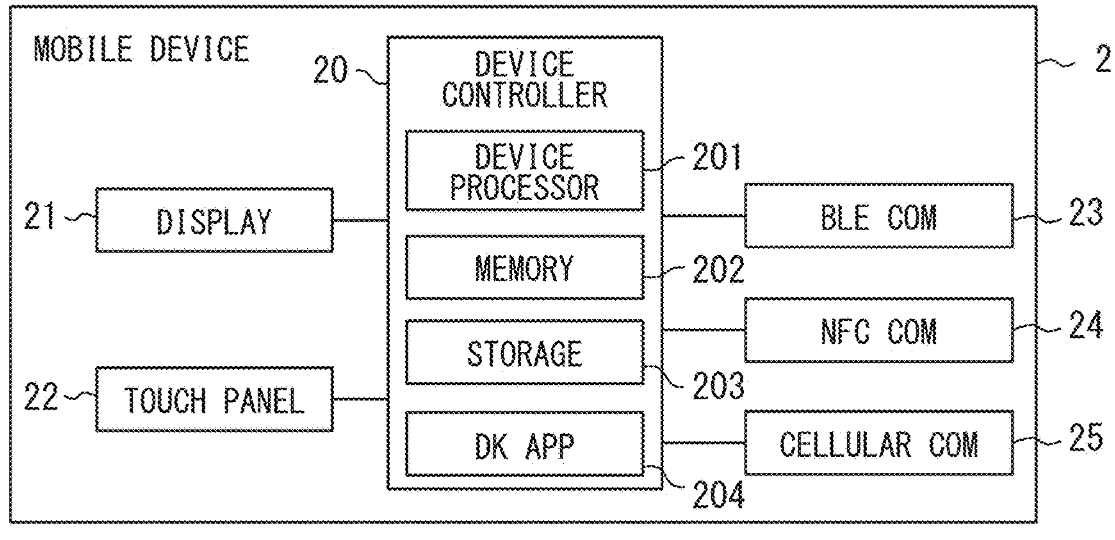
FIG. 3 is a block diagram illustrating a configuration of a mobile device.

As shown in FIG. 3, the mobile device 2 includes a device controller 20, a display 21, a touch panel 22, a BLE communication unit (BLE COM) 23, an NFC communication unit (NFC COMM) 24, and a cellular communication unit (CELLULAR COMM) 25. COM in the drawing represents a communication unit or a communication module.

The device controller 20 is a module that controls an entire operation of the mobile device 2. The device controller 20 is implemented by a computer, which includes a device processor 201, a memory 202, a storage 203, and the like. The device processor 201 is implemented by a CPU. The memory 202 is a volatile storage medium, such as a RAM. The storage 203 includes a non-volatile storage medium, such as a flash memory. The device controller 20 also includes a digital key application (hereinafter referred to as DK application) 204, which is provided by a software program. DK is abbreviation for Digital Key.

The display 21 may be a liquid crystal display or an organic electroluminescent (EL) display. The display 21 displays an image according to an input signal input from the device controller 20. The touch panel 22 is a capacitive touch panel and is arranged on the display 21. The touch panel 22 corresponds to an input apparatus of the mobile device 2.

The BLE communication unit 23 is a communication module for performing the BLE communication. The NFC communication unit 24 is a communication module for performing NFC. In the present disclosure, a portion of the mobile device 2, which can communicate with an NFC medium, such as the card key 1, is referred to as a card reading portion. The card reading portion of the mobile device 2 may be arranged on a back portion of a housing, for example, on a portion opposite to the display 21. The card reading portion corresponds to a portion where the NFC antenna is arranged. The card reading portion may also be referred to as a card set position or an NFC enabled position, etc.

The cellular communication unit 25 is a communication module for performing a cellular communication. In the present disclosure, the cellular communication refers to a wireless communication using mobile phone communication lines provided by mobile communication carriers, such as LTE (Long Term Evolution)/4G, 5G, etc. Each communication module may include an antenna, a transmission reception circuit, and a microcomputer, corresponding to a communication method.

The DK application 204 is an application for performing, with ensured security, the user authentication, the communication with the authentication ECU 4, the communication with the card key 1, or the like. The DK application 204 is installed in the storage 203 or the like.

The term "DK application" in the present disclosure may refer to a device, a device controller, a mobile device itself, or a device processor, which executes the application. Similarly, the term "mobile device" used hereinafter as a subject or an object of a sentence structure may refer to the DK application, the device controller, or the device processor. The DK application 204 corresponds to a software program for a mobile device.

The DK application 204 controls operations of the display 21, the touch panel 22, the BLE communication unit 23, and the NFC communication unit 24. The DK application 204 switches the operation states (active and inactive states) of the BLE communication unit 23 and the NFC communication unit 24.

The active state of the BLE communication unit 23 corresponds to a state in which the function for communicating with the authentication ECU 4 is in operation state. The active state may include a standby state. The inactive state of the BLE communication unit 23 corresponds to a state in which a BLE signal cannot be received, and the reception function is deactivated. The active state of the NFC communication unit 24 corresponds to a state in which the communication with the card key 1 is enabled and a polling command or a command for communication confirmation is periodically transmitted. The inactive state of the NFC communication unit 24 corresponds to a state in which communication with the card key 1 is disabled and transmission of command for establishing or maintaining communication connection is deactivated. The inactive state of the NFC communication unit 24 may be a state in which the power of the NFC communication unit 24 is turned off.

The DK application 204 executes data communication with the authentication ECU 4 via BLE by establishing a link (connection) for BLE communication with the authentication ECU 4. When the DK application 204 receives a challenge code from the authentication ECU 4 via the BLE communication, the DK application 204 communicates with the card key 1 to obtain a response code from the card key 1. Then, the response code is returned to the authentication ECU 4 via the BLE communication. In this manner, the mobile device 2 or the DK application 204 according to the present embodiment can function as a device that relays communication between the authentication ECU 4 and the card key 1.

The device controller 20 may be configured to display, as a function of the DK application 204, a vehicle status confirmation window, which is a window for confirming a status of the vehicle Hv. The vehicle status confirmation window may display a remaining gasoline level or a remaining battery level, open or closed states of the windows or doors, lock or unlock states of the doors, or an inside temperature of the vehicle.

The device controller 20 may be configured to remotely operate a portion of an electrical equipment of the vehicle Hv. In response to a user operation on the touch panel 22, the device controller 20 transmits a wireless signal instructing to lock/unlock the vehicle Hv, turn on/off the air conditioning system, open/close the windows, or turn off the hazard lights. For convenience, the instruction signal for locking the vehicle Hv is referred to as a locking instruction signal.

The mobile device 2 may be a smart key that is a dedicated device as an electronic key of the vehicle Hv under a condition that the mobile device 2 has the BLE communication function and the NFC function. Usually, the smart key is handed over to the owner together with the vehicle Hv when the vehicle Hv is purchased. The smart key can be regarded as one of accessories of the vehicle Hv. The smart key can adopt various shapes such as a flat rectangular parallelepiped shape, a flat elliptical shape (known as a fob type), or a card shape. The smart key may be referred to as a vehicle mobile device, a key fob, an access key, or the like.

(In-Vehicle System 3)

Figure 4:
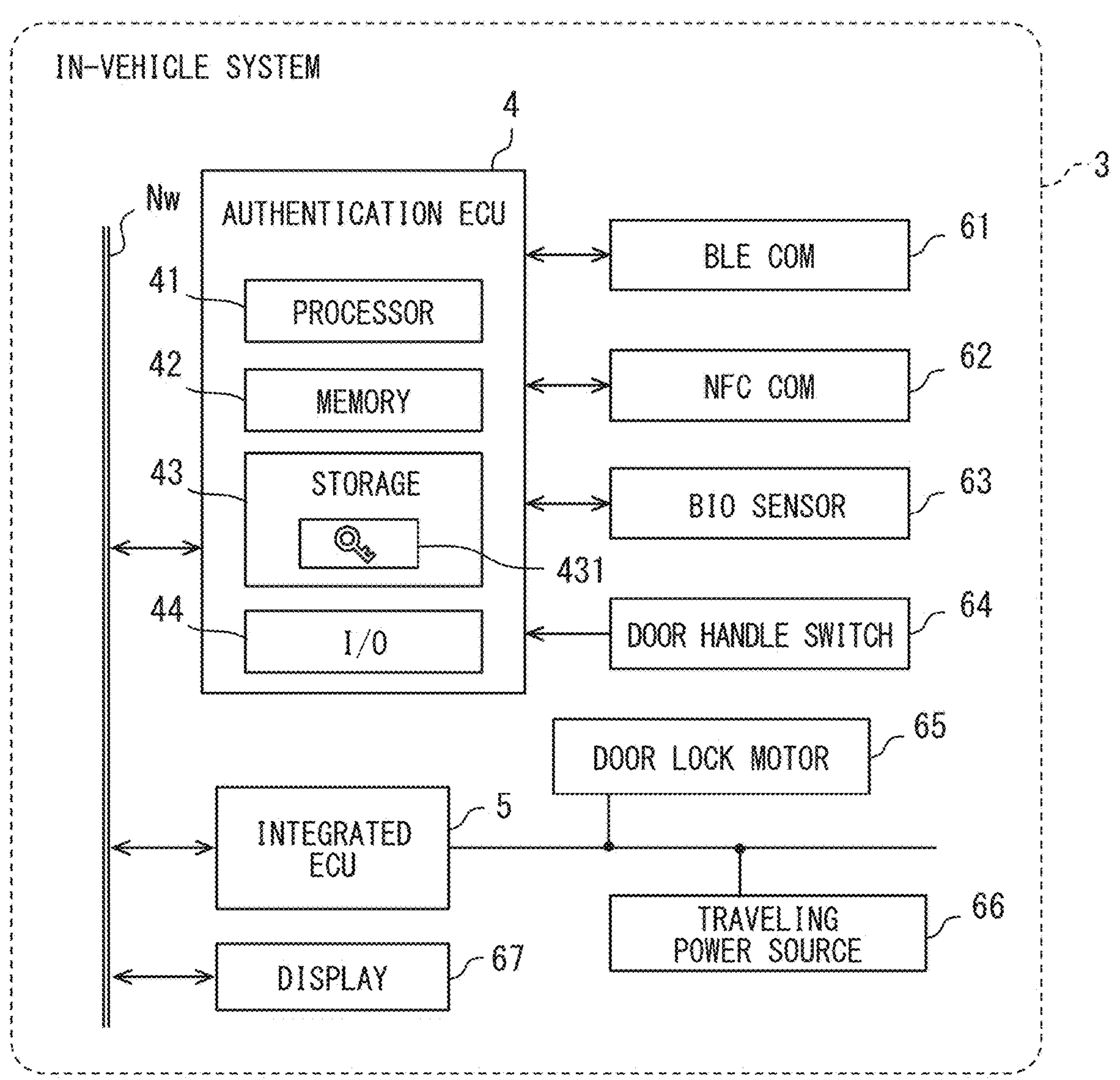
FIG. 4 is a block diagram showing a configuration of an in-vehicle system.

As shown in FIG. 4, the in-vehicle system 3 includes the authentication ECU 4, the integrated ECU 5, a BLE communication device (BLE COM) 61, an NFC communication device (NFC COM) 62, a biometric authentication sensor (BIO SENSOR) 63, a door handle switch 64, a door lock motor 65, a traveling power source 66, and an in-vehicle display (DISPLAY) 67.

The authentication ECU 4 is connected to the BLE communication device 61, the NFC communication device 62, the biometric authentication sensor 63, and the door handle switch 64 via respective dedicated signal lines. The authentication ECU 4 is connected to the integrated ECU 5 and the in-vehicle display 67 via an in-vehicle network Nw and performs a communication with the components connected to the in-vehicle network. The door lock motor 65 and the traveling power source 66 are connected to the integrated ECU 5 and communicate with the integrated ECU 5. The in-vehicle network Nw is a communication network installed in the vehicle Hv. As the in-vehicle network Nw, various standards can be adopted. The connection configuration shown in FIG. 4 is an example, and the specific connection configuration of the devices and network may be changed as appropriate. The door handle switch 64 may be connected to the integrated ECU 5, or may be connected to the in-vehicle network Nw so as to communication with the authentication ECU 4 and the integrated ECU 5.

The authentication ECU 4 is an ECU that determines whether a person attempting to access the vehicle Hv is a legitimate user. The authentication ECU 4 performs user authentication. The authentication ECU 4 corresponds to an authentication unit. The authentication ECU 4 is implemented by a computer. For example, the authentication ECU 4 includes a processor 41, a memory 42, a storage 43, an input/output circuit (I/O) 44, and a bus line connecting these components. The processor 41 is a computing core such as a CPU or a GPU. The memory 42 is a volatile memory such as a RAM. The storage 43 includes a non-volatile storage medium, such as a flash memory.

The storage 43 includes a vehicle key storage area 431, which is a storage area for storing the vehicle key code. The vehicle key storage area 431 corresponds to a first storage device. The vehicle key code stored in the vehicle key storage area 431 corresponds to the first key code. The storage 43 stores a vehicle authentication program to be executed by the processor 41. The processor 41 executes a vehicle authentication program to implement the function of each functional block to be described below. The execution of vehicle authentication program by the processor 41 corresponds to the execution of a user authentication method corresponding to the program. The input/output circuit 44 is a circuit module for communicating with other devices.

The operation of authentication ECU 4 for user authentication will be described in detail later. The authentication ECU 4 periodically inputs a signal indicating an authentication status (authenticated/unauthenticated) of the user to the integrated ECU 5. In the present disclosure, a signal indicating that user authentication has been successful is referred to as an authentication success signal. When the user authentication fails, the authentication ECU 4 may output, to the integrated ECU 5, an authentication failure signal indicating that the user authentication has failed.

The integrated ECU 5 performs a vehicle control in accordance with the operation made by the user on the vehicle Hv under a condition that the user authentication by the authentication ECU 4 is succeeded. The integrated ECU 5 performs vehicle control, such as unlocking/locking the vehicle Hv or switching on/off the traveling power source 66.

When the door handle switch 64 is pressed in a state where the user is successfully authenticated, the integrated ECU 5 outputs an unlock instruction signal to the door lock motor 65 equipped to each door of the vehicle Hv. As a result, the integrated ECU 5 switches the locking mechanism of each door from a locked state to an unlocked state. In a state where the user is successfully authenticated, the integrated ECU 5 switches the traveling power source 66 from off state to on state in response to a pressing operation made on the start switch of the vehicle by the user. In a state where the user is successfully authenticated, the integrated ECU 5 locks the vehicle Hv in response to a locking operation made by the user being detected.

The state where the user is successfully authenticated is also referred to as a user authenticated state for simplification. The integrated ECU 5 determines whether the user is successfully authenticated based on an input signal from the authentication ECU 4. The integrated ECU 5 may operate assuming that the user is successfully authenticated for a predetermined period of time after an authentication success signal is input from the authentication ECU 4. The integrated ECU 5 may determine that the user is in the user authenticated state only while the authentication success signal is being input from the authentication ECU 4.

The user authentication may be triggered by a user operation as described below. The authentication ECU 4 may execute a user authentication process in response to an unlocking operation made by the user or the like as a trigger, and the integrated ECU 5 may unlock the vehicle Hv in response to the authentication of user being successful. The execution conditions for various vehicle controls may include a position of the user or a position of the mobile device 2, relative to the vehicle Hv. The control of locking and unlocking of vehicle may be executed under a condition that the mobile device 2 or the user is located within a predetermined distance outside the vehicle compartment. The traveling power source may be turned on under a condition that the mobile device 2 or the user being located inside the vehicle. The integrated ECU 5 may be integrated with the authentication ECU 4 as a single ECU. The functional configuration of the devices in the in-vehicle system 3 can be changed as appropriate.

The BLE communication device 61 is a communication module for executing the BLE communication. The BLE communication device 61 operates based on a control signal from the authentication ECU 4. The BLE communication device 61 provides the authentication ECU 4 with the data received from the mobile device 2 and data related to the reception status of the signal from the mobile device 2. The BLE communication device 61 transmits the data input from the authentication ECU 4 to the mobile device 2. The BLE communication device 61 may be arranged in a housing of the authentication ECU 4. That is, the BLE communication device 61 may be incorporated in the authentication ECU 4. The in-vehicle system 3 may be equipped with multiple BLE communication devices 61.

The NFC communication device 62 is a communication module for executing the NFC communication. The NFC communication device 62 may be arranged on an outer surface of the vehicle Hv and near the driver's seat inside the vehicle. Locations for arranging the NFC communication device 62 on the outer surface of the vehicle may include the B-pillar, C-pillar, side mirror, or exterior door handle, which is/are close to the driver's seat. An operation state of each of the multiple NFC communication devices 62 is controlled by the authentication ECU 4. It should be noted that the NFC communication device 62 is an optional element and may be omitted.

The biometric authentication sensor 63 reads biometric information of the user, which can be used for the user authentication. The biometric information of the user that can be used for the user authentication may be a fingerprint, a vein pattern, a face image, an iris pattern, or a voice. The in-vehicle system 3 may include, as the biometric authentication sensor 63, one or more types of sensors from a fingerprint reader, a vein scanner, a camera, or a microphone. The fingerprint reader is a device that reads fingerprint information, and outputs, to the authentication ECU 4, data indicating a distribution pattern of capacitance generated by multiple electrodes, or a distribution pattern of feature points determined based on the distribution pattern. The vein scanner is a device that uses infrared light to read the vein patterns of a hand or a finger.

The in-vehicle system 3 may be equipped with an exterior fingerprint reader and an interior fingerprint reader. The exterior fingerprint reader is a fingerprint reader equipped to an exterior part of the vehicle Hv, such as an exterior door handle of the driver's seat. The exterior fingerprint reader is provided to enable the user outside the vehicle to lock or unlock the vehicle Hv. The interior fingerprint reader is a fingerprint reader that is arranged around the driver's seat inside the vehicle, such as on a steering wheel or an instrument panel. The biometric authentication sensor 63 is activated in response to an instruction from the authentication ECU 4, and acquires biometric information of a person (target) to be authenticated. Then, the observed biometric data, which is data indicating the acquired biometric information of target, is output to the authentication ECU 4. It should be noted that the biometric authentication sensor 63 is an optional element and may be omitted.

The door handle switch 64 is a touch sensor or a push switch for detecting an operation made by the user to unlock or lock a door of the vehicle Hv. The door handle switch 64 may be provided on or in the vicinity of the exterior door handle of the vehicle Hv. The in-vehicle system 3 may include a door bottom motion sensor as a sensor for detecting the user's operation for locking or unlocking the door. The door bottom motion sensor detects a moving of foot toward a door bottom by transmitting infrared lights or ultrasonic waves toward a specific area under the door.

The door lock motor 65 switches a state (locked, unlocked) of the lock mechanism of each door. The door lock motor 65 is provided for each door. The traveling power source 66 is a power source supplying a power to the vehicle Hv for traveling purpose. The traveling power source corresponds to an ignition power source when the vehicle is an engine vehicle. When the vehicle Hv is an electric vehicle, the traveling power source 66 corresponds a system main relay.

The in-vehicle display 67 is a display device mounted on the vehicle Hv, and is implemented by a liquid crystal display or an organic EL display. The in-vehicle display 67 is disposed in a center area of the instrument panel in the vehicle width direction, or disposed in a front area of the driver's seat. The in-vehicle display 67 may be a projector that projects an image over an outside road surface or a side window.

The in-vehicle system 3 also includes various ECUs and sensors except the ECUs and sensors described above. Various signals are input to the authentication ECU 4 and the integrated ECU 5. The authentication ECU 4 and the integrated ECU 5 can receive signals output from various sensors, such as a start switch, a brake pedal sensor, a shift position sensor, a courtesy switch, and a seating sensor. The start switch is a push switch for turning on or turning off the traveling power source 66. The start switch is disposed around the driver's seat inside the vehicle. The brake pedal sensor is a sensor that outputs a signal indicating a pressed amount of brake pedal or a pressing force of brake pedal, by the user. The shift position sensor is a sensor that outputs a signal indicating a set position of the shift. The courtesy sensor is a sensor that outputs a signal indicating an open state or a closed state of the door, and is arranged corresponding to each door. The seating sensor is a sensor that detects whether a person is seated on the seat, and is arranged, for example, in the driver's seat.

(BLE Authentication Process)

The authentication ECU 4 cooperates with the BLE communication device 61 to execute a BLE authentication process. The BLE authentication process is a user authentication process executed via BLE communication. The mobile device 2 and the card key 1 are linked to a user. When the authentication ECU 4 uses the vehicle key code to verify the legitimacy of the communication partner (mobile device 2 or card key 1) for authenticating the mobile device 2 or the card key 1, the process is equivalent to a process for authenticating the user. User authentication in the present disclosure may be interpreted as device authentication or code authentication, as appropriate.

Figure 5:
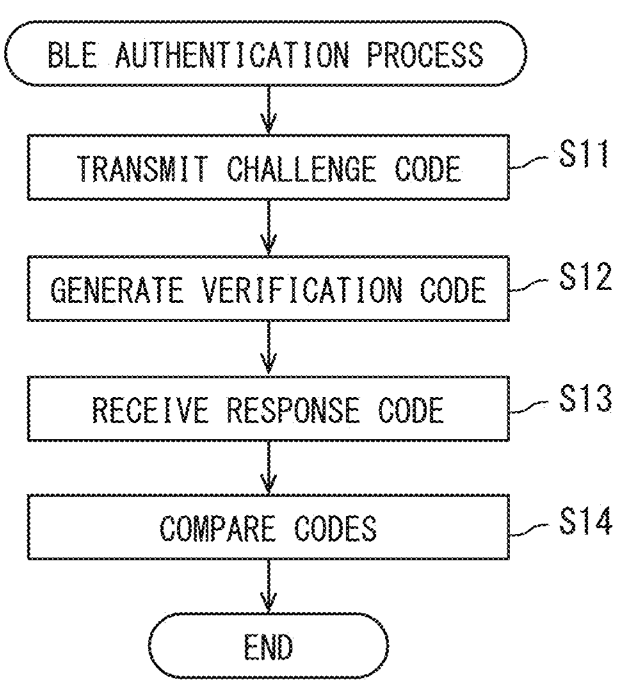
FIG. 5 is a flowchart showing a process of BLE authentication.

The BLE authentication process can be executed in a challenge-response manner as described above. As shown in FIG. 5, the wireless authentication process may include steps S11 to S14. Each step of FIG. 5 is executed by the authentication ECU 4. The operation of entire system may include a step of the mobile device 2 receiving a challenge code, a step of the mobile device 2 transmitting the received challenge code to the card key 1, and a step of the mobile device 2 receiving a response code from the card key 1 and returning the received response code to the authentication ECU 4.

In S11, the authentication ECU 4 transmits a challenge code to the mobile device 2 via BLE. The challenge code may be a random number that has a predetermined length and is generated using a random number table prepared in advance. The challenge code may be a random number generated with clock time information (that is, system time) provided in the authentication ECU 4 as SEED. The challenge code may be determined in various different ways. The data set including the challenge code corresponds to the first data.

In S12, the authentication ECU 4 generates a verification code according to a predetermined procedure using the vehicle key code stored in the authentication ECU 4 and the challenge code transmitted to the mobile device 2. The verification code is a code for verifying a validity of response code, thereby verifying a validity of the person attempting to access the vehicle Hv. The verification code may be referred to as verification authentication code.

In S13, the authentication ECU 4 receives the response code transmitted from the mobile device 2. In S14, the authentication ECU 4 compares the response code returned from the mobile device 2 with the generated verification code. In response to the verification code matching with the received response code, the authentication ECU 4 determines that the user authentication is successful.

In the code comparison process S14, the authentication ECU 4 may determine whether the original challenge code can be obtained by decrypting the received response code using the vehicle key code stored in the authentication ECU 4. In that case, the generation of verification code in S12 may be omitted. The method of user authentication via wireless communication is not limited to the challenge-response method, and various other methods can be adopted.

The authentication ECU 4 can execute the above-mentioned BLE authentication process at various time points and under various conditions. The authentication ECU 4 may execute the BLE authentication process when a communication connection between the BLE communication device 61 and the mobile device 2 is established as a trigger. The authentication ECU 4 may execute the BLE authentication process at a predetermined period while the BLE communication device 61 and the mobile device 2 are communicatively connected with one another.

The authentication ECU 4 may perform communication for executing the BLE authentication process in response to a detection of a predetermined authentication event. The authentication event may be locking or unlocking operation, starting operation, closing operation of a door, or pressing of a brake pedal. The locking operation refers to a touching of the door handle switch 64 when the traveling power source 66 is in off state and all of the doors are in closed states. The unlocking operation refers to a touching of the outside door handle or placing a foot under the door when the traveling power source 66 is in off state and all of the doors are in closed states. The starting operation refers to a pressing of the start switch when the brake pedal is in a pressed state. The closing operation of a door refers to a closing operation of a door of the vehicle. The authentication ECU 4 detects various operations made by the user based on input signals from various sensors mounted on the vehicle Hv. The function for detecting the user's operations may be provided by the integrated ECU 5. The authentication ECU 4 may be configured to perform user authentication based on a request from the integrated ECU 5. The establishment of a communication link between the authentication ECU 4 and the mobile device 2 may also be included in the authentication event.

(Authentication Process Using Different Method)

As another example, the authentication ECU 4 of the present embodiment is configured to be able to execute an NFC authentication process or a biometric authentication process. The NFC authentication process is user authentication process using NFC. The biometric authentication process is a user authentication process using biometric information. The NFC authentication process or the biometric authentication process corresponds to a backup (i.e., an alternative authentication method) in the case where the BLE authentication fails or is not available.

In the NFC authentication process, the vehicle Hv receives a response code from the card key 1 by communicating directly with the card key 1 without communicating with the card key 1 via the mobile device 2. The BLE authentication process and the NFC authentication process differ only in the device that the direct communication partner for the authentication ECU 4 and the communication method. The procedure for NFC authentication may be generally similar to that of the BLE authentication. The biometric authentication process is a process for determining whether a target is a legitimate user by comparing observed biometric data received from the biometric authentication sensor 63 with biometric information of the legitimate user that is registered in advance in the storage 43.

(Device Location Specification)

The vehicle authentication program may include a device location specifying program that is a program for specifying a device location, in addition to the program for performing user authentication. The authentication ECU 4 can also have a function of specifying the device location. In the present disclosure, device location refers to the location of mobile device 2 relative to the vehicle. Since the mobile device 2 is carried by a user, specifying of the device location is equivalent to specifying of the user's location.

The authentication ECU 4 may specify the device location based on a reception strength of a signal from the mobile device 2. The reception strength of received signal is acquired from the BLE communication device 61. The authentication ECU 4 may calculate a distance measurement value by performing two-way communication with the mobile device 2, and use the distance measurement value to determine whether the user is located within a predetermined distance (e.g., 1.5 meters) from the vehicle Hv. The measured distance is a parameter indicating the distance from the BLE communication device 61 to the mobile device 2, and correspond to the time of flight (ToF) of radio waves.

When the in-vehicle system 3 is equipped with multiple BLE communication devices 61 as anchors, the device location coordinates relative to the vehicle Hv may be calculated using the reception strength/distance measurement value observed by each of the multiple BLE communication devices 61 and the mounting location information of each BLE communication device 61. Calculation of device location coordinates can be performed using techniques similar to three points or multiple points positioning in the art fields of GPS and location estimation. The authentication ECU 4 may determine an area of the device or may calculate the device position coordinates. The determination of area of the device refers to specifying whether the mobile device 2 is located in any one of multiple areas or zones that are set in advance in the vehicle Hv. The multiple areas or zones my include a far outside area or a close outside area, relative to the vehicle Hv, or inside the vehicle Hv.

(BLE Authentication Process)

When a user accesses the vehicle Hv using the BLE authentication, a series of actions are expected to be performed, such as approaching the vehicle Hv with the card key 1 placed over the card reading portion of the mobile device 2 and pressing or touching the door handle switch 64. The operations of the authentication ECU 4, the mobile device 2, and the card key 1 associated with the above series of actions will now be described with reference to FIG. 6.

First, as a premise, when the mobile device 2 is not connected, for communication purpose, with the card key 1, the mobile device 2 periodically transmits a predetermined polling command from the NFC communication unit 24 in S21. When the user places the card key 1 over the card reading portion of the mobile device 2, the card key 1 is activated by the electromagnetic field emitted from the NFC communication unit 24 in S22, and establishes the NFC communication link with the mobile device 2 in S23. The state in which the NFC communication link is established can be understood as a state in which mutual authentication has been completed. In the present disclosure, the action of user overlapping the card key 1 with the card reading portion of the mobile device 2 is referred to as an overlapping operation. The mobile device 2 can detect the overlapping operation in response to the NFC communication unit 24 receiving a response signal from the card key 1.

Upon establishing a communication connection with the card key 1, the mobile device 2 notifies the user that communication with the card key 1 is available in S24. The notification can be implemented by (i) outputting a predetermined notification sound or sound effect from a speaker or displaying a predetermined icon or message on the display 21.

The mobile device 2 may record, in the storage 203 or the memory 202, a card connection time, which is the time when the NFC communication with the card key 1 is established. The card connection time may correspond to the time when the card key 1 is placed over the card reading portion of the mobile device 2. When the mobile device 2 of the present embodiment is able to communicate with the card key 1 via NFC, the mobile device 2 maintains the connection with the card key 1 by periodically transmitting and receiving a signal (command) to and from the card key to confirm the communication state with the card key 1. The mobile device 2 periodically checks whether the available state of NFC with the card key 1 is being maintained. In the present disclosure, the process executed in S21 to S24 is referred to as a device-key connection sequence.

The authentication ECU 4 executes a vehicle-device connection sequence independently of the device-key connection sequence. The authentication ECU 4 may periodically execute a scanning process in S25. The scanning process is a process for detecting the mobile device 2. The scanning process may be executed in a manner compliant with the BLE standard. The authentication ECU 4 may search for the mobile device 2 located in the vicinity of the vehicle Hv using a passive scanning method. The authentication ECU 4 may search for the mobile device 2 using an active scan method by transmitting a scan request. The two types of scan methods may be properly used depending on the specific scene. In a parked waiting scene, the authentication ECU 4 searches for the mobile device 2 using the passive scanning method. When the authentication ECU 4 detects a predetermined event, such as pressing the door handle switch 64, the authentication ECU 4 may search for the mobile device 2 using the active scanning method. The scanning process may be executed based on the occurrence of predetermined authentication event.

When the authentication ECU 4 detects the mobile device 2 by the scanning process (S25A: YES), the authentication ECU 4 establishes a BLE communication link with the mobile device 2 (S26). The case where the authentication ECU 4 is capable of performing BLE communication with the mobile device 2 may correspond to the case where the user approaches the vehicle Hv. In the present disclosure, the process executed in S25 to S26 is referred to as the vehicle-device connection sequence.

In response to detecting that the user has performed an unlocking operation based on an input signal from the door handle switch 64, the authentication ECU 4 transmits a BLE signal including a challenge code to the mobile device 2 in S31A. The authentication ECU 4 generates a verification code using the challenge code transmitted to the mobile device 2 and the vehicle key code stored in the local, that is, the authentication ECU 4 in S32.

When the mobile device 2 receives the challenge code transmitted from the authentication ECU 4 in S31B, the mobile device 2 transmits the challenge code to the card key 1 via the NFC communication in S33A. The signal including the challenge code may act as a signal requesting generation of a response code. The signal that includes the challenge code may be referred to as an authentication request signal. The mobile device 2 converts, in S33A, the authentication request signal conforming to the BLE standard into a signal conforming to the NFC standard, and transmits the converted signal to the card key 1.

When the card key 1 receives the challenge code from the mobile device 2 via NFC in S33B, the card key 1 generates a response code using the challenge code and the vehicle key code stored in the card storage area 161 in S34. Then, the card key 1 transmits the generated response code to the mobile device 2 via NFC in S35A.

When the mobile device 2 receives the response code from the card key 1 in S35B, the mobile device 2 transmits the received response code to the authentication ECU 4 via BLE communication in S36A. The signal including the response code is a signal that responds to the authentication request signal transmitted from the authentication ECU 4 for user authentication. Thus, the signal including the response code is also referred to as an authentication response signal. The mobile device 2 converts, in S36A, the authentication response signal conforming to the NFC standard into a signal conforming to the BLE standard, and transmits the converted signal to the authentication ECU 4.

When the authentication ECU 4 receives the response code from the mobile device 2 in S36B, in S37, the authentication ECU 4 determines whether the received response code is identical to or matches the verification code generated in advance in S32. When the communication partner of the authentication ECU 4 is the mobile device 2, which is connected to the card key 1, the received response code is identical to or matches the verification code generated in advance in S32. The presence of mobile device 2 connected to the card key 1 in the vicinity of the vehicle Hv leads to a presumption that the person attempting to use the vehicle Hv is the user. Therefore, when the received response code matches the verification code generated by the authentication ECU 4, the authentication ECU 4 determines that the user authentication is successful. When the received response code does not match the verification code generated by the authentication ECU 4, the authentication ECU 4 determines that the user authentication has failed. The authentication ECU 4 may also determine that the authentication has failed when a response code is not received even after a predetermined response waiting period has elapsed from the transmission time of challenge code. In the present disclosure, the process executed in S31A to S37 is referred to as a BLE authentication sequence.

When the authentication ECU 4 completes the code matching in S37, the authentication ECU 4 transmits a signal indicating the authentication result to the integrated ECU 5. When the integrated ECU 5 receives the authentication success signal, the integrated ECU 5 unlocks the vehicle Hv. When the integrated ECU receives the authentication failure signal, the integrated ECU 5 may display, on the in-vehicle display 67, an authentication failure image indicating that the BLE authentication has failed. The integrated ECU 5 may cause the display 21 of the mobile device 2 to display an authentication failure image by transmitting a predetermined BLE signal to the mobile device 2. According to this configuration, the user can recognize that wireless authentication using the mobile device 2, that is, BLE authentication has failed.

Technical Effects

As described above, the BLE authentication process in the present embodiment corresponds to a method in which the authentication ECU 4 communicates with the card key 1 via the mobile device 2. The mobile device 2 is configured to relay communication between the card key 1 and the authentication ECU 4.

The vehicle key code is not stored in the mobile device 2. Thus, if the card key 1 is not placed over the card reading portion of the mobile device 2, the mobile device 2 cannot access the vehicle key code. When the card key 1 is separated from the mobile device 2, the card key 1 is physically disconnected from a wide area network such as the Internet.

When the card key 1 is not placed over the card reading portion of the mobile device 2, the vehicle key code will not be stolen even if the mobile device 2 is hacked. Thus, a risk of the vehicle key code being stolen through hacking of the mobile device 2 can be reduced. In a situation where the card key 1 is held or carried by the user and is placed away from the card reading portion of the mobile device 2, it is difficult for a third party other than the user to illegally establish communication between the vehicle Hv and the card key 1 using a relay attack.

When the card key 1 is placed over the card reading portion of the mobile device 2, the mobile device 2 functions as a dedicated key for implementing the Passive Entry/Passive Start (PEPS) system as the related art described above. The user can unlock or lock the vehicle Hv, turning on the power, without operating the mobile device 2.

According to the configuration of the present embodiment, the BLE authentication function can be enabled by overlapping the card key 1 with the card reading portion of the mobile device 2, and the BLE authentication function can be disabled by separating the card key 1 from the card reading portion of the mobile device 2, according to the user's convenience or user's determination. This configuration can provide user convenience together with improved security. The user convenience can be increased by keeping the card key 1 placed over the card reading portion of the mobile device 2 while the vehicle Hv is being used or while the vehicle is being parked in an environment with a relatively low risk of theft. In a situation where the risk of theft is high, such as night time or in a parking lot of commercial facility or restaurant, the user can reduce the theft risk of the vehicle Hv using a relay attack by separating the card key 1 away from the card reading portion of the mobile device 2.

In the present embodiment, the mobile device 2 does not need to perform data communication with the digital key server such that the mobile device 2 can function as a digital key of the vehicle Hv. According to this configuration, the digital key server can be omitted. Accordingly, maintenance cost and security cost for the digital key server can be eliminated. Thus, maintenance cost of the entire system can be reduced. The digital key server is a server that distributes, to the mobile device 2, a temporary authentication key for accessing the vehicle Hv.

The mobile device 2 and the authentication ECU 4 do not need to perform data communication with the digital key server when unlocking the vehicle Hv. Thus, the user can use the mobile device 2 as a key of the vehicle Hv even when the user is outside the range of cellular communication. In the present embodiment, the mobile device 2 and the authentication ECU 4 do not need to perform a cellular communication function, thereby simplifying the authentication process and reducing the cost for authentication.

In the present embodiment, the authentication ECU 4 only needs to have the same function as a case where the mobile device 2 stores the vehicle key code as in the related art.

Compared to the configuration of related art, the in-vehicle system 3 does not require the addition of dedicated purpose hardware or dedicated purpose software. According to the configuration of the present embodiment, it is possible to enhance security while suppressing an increase in the manufacturing and maintenance cost of the in-vehicle system 3.

According to the above configuration, the response code is generated by the card key 1. Thus, the vehicle key code is not transmitted over the communication line. That is, there is no situation in which the vehicle key code is transmitted or received between devices except when the vehicle key code is registered in the card key. Therefore, it is possible to improve security than the configuration described below as a first modification example.

As a comparative configuration, an in-vehicle system that does not include the above-mentioned BLE authentication but supports only the NFC authentication with be described In this comparative configuration, the user needs to take out the card key 1 from his or her bag or pocket and put the card key 1 over the NFC communication unit of the vehicle every time the user uses the vehicle. Compared with the comparative configuration, the configuration of the present embodiment has the advantage that by placing the card key 1 over the card reading portion of the mobile device 2, it is possible to control the vehicle, for example, unlocking the vehicle, without placing the card key 1 over the NFC communication unit of the vehicle.

In the configuration of the present embodiment, the vehicle Hv is equipped with the NFC communication device 62. Thus, the NFC authentication can be performed as a backup means. According to the configuration of the present embodiment, the user can use the vehicle Hv by performing the NFC authentication, even when the BLE authentication cannot be performed due to the battery of the mobile device 2 running out, malfunction of the BLE communication device 61, or malfunction of the BLE communication unit 23.

Although the embodiment of the present disclosure has been described above, the present disclosure is not limited to the above-described embodiment, and various supplements and modifications described below are also included in the technical scope of the present disclosure. The configuration of the present disclosure may be modified in various ways without departing from the spirit and scope of the present disclosure, in addition to the following modifications. The various supplements and modifications described below may be implemented in any suitable combination as long as no technical contradictions arise. Components having the same functions as the components described above are denoted by the same reference symbols, and the description thereof may be omitted. When only a part of the configuration is described, the description in the above embodiment can be applied to the remaining configuration.

(First Modification)

Figure 7:
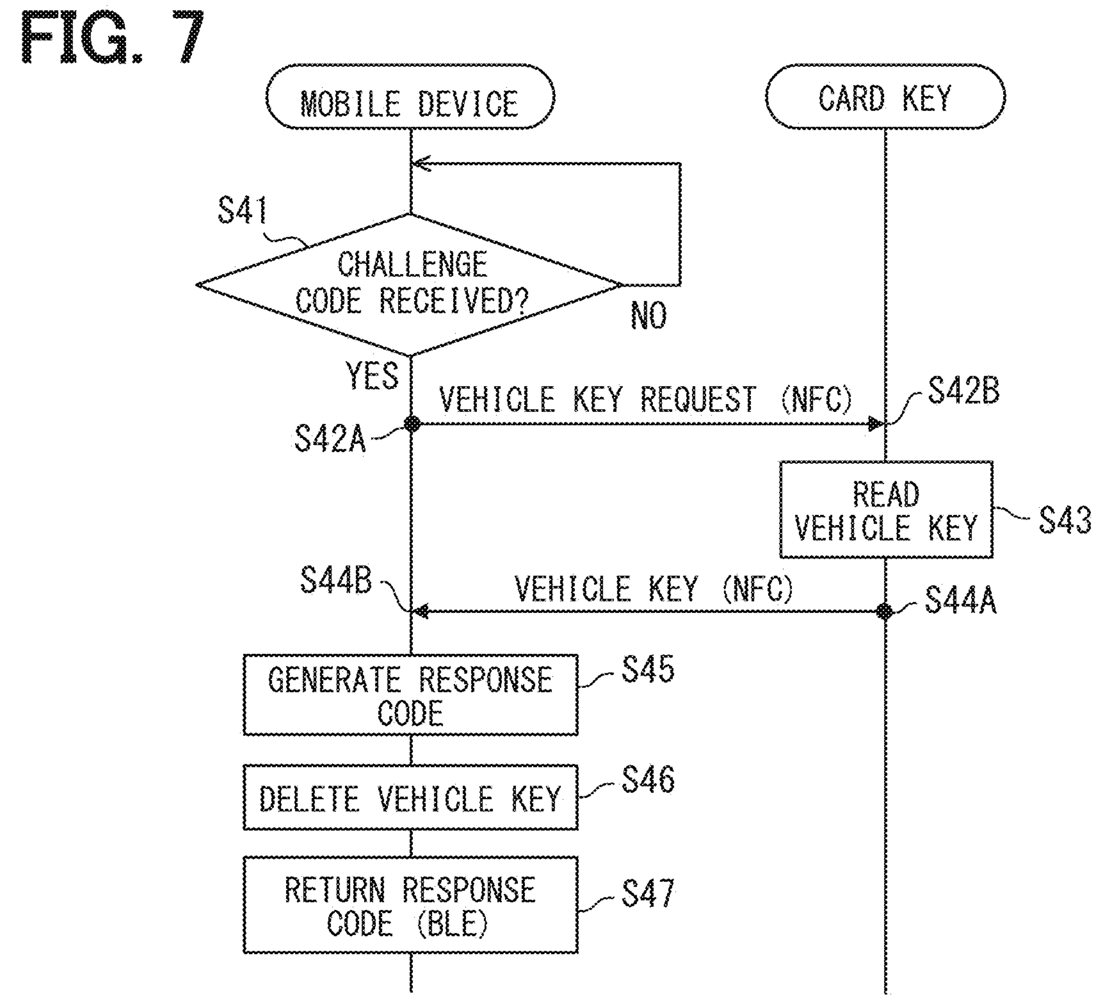
FIG. 7 is a sequence diagram showing a modified example of a method for acquiring a response code in a mobile device.

In the above embodiment, the card key 1 generates the response code and transmits the generated response code to the mobile device 2. The method by which the mobile device 2 obtains the response code is not limited to this configuration. As shown in FIG. 7, the mobile device 2 may receive the vehicle key code from the card key 1 and generate a response code. The sequence shown in FIG. 7 is an alternative process of the process executed in S31B to S35B in FIG. 6 and is executed on the condition that the mobile device 2 is in a state capable of performing the NFC communication with the card key 1.

In S41 of FIG. 7, the mobile device 2 determines whether a challenge code is received from the authentication ECU 4 via BLE communication. In a state where the BLE connection with the authentication ECU 4 is established, the mobile device 2 may execute S41 at a predetermined period. In response to the mobile device 2 receiving the challenge code from the authentication ECU 4 via BLE, the mobile device 2 executes S42A and subsequent process shown in FIG. 7.

When the mobile device 2 receives the challenge code from the authentication ECU 4 (S41: YES), the mobile device 2 transmits a vehicle key request signal to the card key 1 via NFC in S42A. The vehicle key request signal is an NFC signal requesting transmission of the vehicle key code from the card key to the mobile device. In response to receiving the vehicle key request signal from the mobile device 2, the card key 1 reads the vehicle key code stored in the card storage area 161 in S43, and transmits the readout vehicle key code to the mobile device 2 via NFC in S44A.

When the mobile device 2 receives the vehicle key code from the card key 1 in S44B), the mobile device 2 generates a response code using the received vehicle key code in S45. When the generation of response code is completed, the mobile device 2 deletes the vehicle key code received from the card key 1 from the mobile device 2 in S46. For example, the mobile device 2 may delete the vehicle key code stored in the memory 202 within one second after generating the response data. The mobile device 2 may be restricted so that the vehicle key code received by the card key 1 can only be stored in a temporary memory, such as a RAM. Then, the mobile device 2 transmits the generated response code to the authentication ECU 4 via BLE in S47.

In one aspect, the above configuration corresponds to a configuration in which the vehicle key code is written to the card key 1, and the mobile device 2 reads the vehicle key code from the card key 1 only when it is necessary to generate a response code. This configuration also makes it possible to temporarily limit the duration for which the mobile device 2 holds the vehicle key code, thereby improving security compared to a configuration in which the vehicle key code is constantly stored in the mobile device 2.

(Second Modification)

Figure 8:
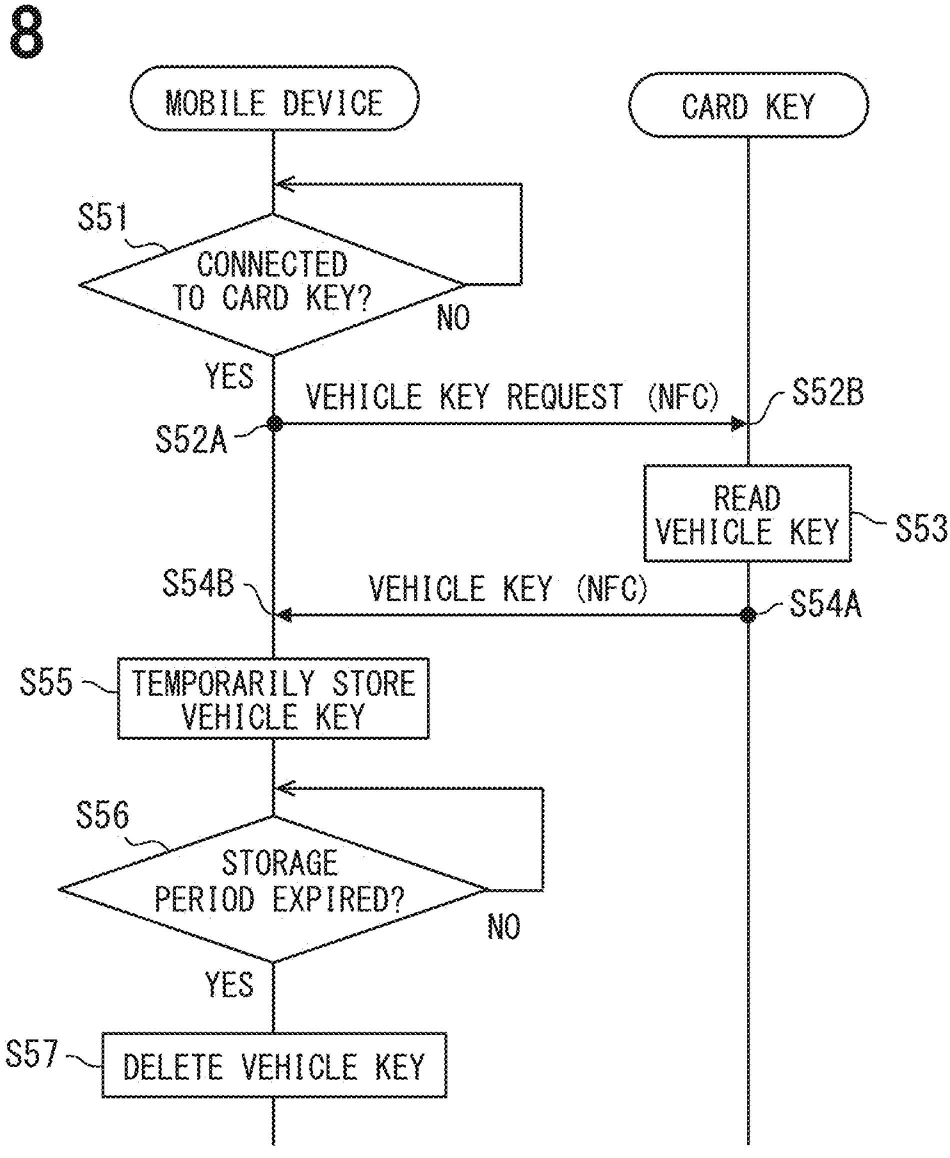
FIG. 8 is a sequence diagram showing a modified example of a method for managing a vehicle key code in a mobile device.

As a further modification of the above-described first modification, as shown in FIG. 8, the mobile device 2 may be configured to obtain the vehicle key code from the card key 1 when the communication between the mobile device 2 and the card key 1 is established, regardless of whether a challenge code is received or not. Then, the mobile device 2 may store the obtained vehicle key code for a certain period of time in the local. The mobile device 2 determines, in S51 of FIG. 8, whether a communication with the card key 1 is established. The mobile device 2 transmits, in S52A, a vehicle key request signal to the card key 1 in response to the mobile device 2 being capable of performing the NFC communication with the card key 1. As described above, upon receiving the vehicle key request signal in S52B, the card key 1 reads the vehicle key code from the card storage area 161 in S53, and transmits the readout vehicle key code to the mobile device 2 in S54A.

In S55, the mobile device 2 stores the vehicle key code received from the card key 1 in the memory 202, and records the storing time of the vehicle key code. The mobile device 2 determines, in S56, whether the time elapsed from the storing time of the vehicle key code has exceeded a predetermined storage period. The storage period may be set to 5 minutes or less, such as 30 seconds, 1 minute, or 3 minutes. In this modification example, the mobile device 2 automatically deletes the vehicle key code when the storage period of the vehicle key code has expired in S57.

According to the second modification, when the mobile device 2 receives a challenge code from the authentication ECU 4, the mobile device 2 can omit the NFC communication with the card key 1, thereby enabling quick obtaining of the vehicle key code and quick returning of the response code to the authentication ECU. This configuration improves the user's convenience since the system provides a quick response to the vehicle operation made by the user. In this modification, the mobile device 2 temporarily stores the vehicle key code. Thus, security can be improved compared to a configuration in which the vehicle key code is constantly stored in the mobile device 2. After the vehicle key code is deleted from the memory 202 in response to the expiration of the storage duration, the mobile device 2 may be configured to execute the above-described process executed in S41 to S47.

(Third Modification)

As a further modification of the first and second modifications, the mobile device 2 may be configured to receive and store the vehicle key code from the card key 1 with a limited number of uses. The vehicle key code with a limited number of use corresponds to a vehicle key code that can be used a fixed number of times. According to this configuration, even when the card key 1 is temporarily removed from the card reading portion of the mobile device 2, the mobile device 2 can generate and return the response code. For the vehicle key code stored in the mobile device 2, a number of times by which it can be used is set in advance. Thus, it is possible to prevent a third party, who only possesses the mobile device 2, from accessing the vehicle Hv for indefinite times of use.

(Fourth Modification)

As a further modification of the first to third modifications, the authentication ECU 4 may be configured to generate the verification code using a temporary key code generated based on the vehicle key code, instead of using the vehicle key code itself. The temporary key code may be a code that combines the vehicle key code with date and time information when the authentication process is executed. In response to a vehicle key transmission request from the mobile device 2, the card key 1 may return a temporary key code, which is generated by combining the vehicle key code stored in the card storage area 161 with date and time information. The mobile device 2 generates a response code using the temporary key code transmitted from the card key 1, and returns the response code to the authentication ECU 4.

Usually, a general credit card does not have a clock function. The card key 1 may receive the date and time information from the mobile device 2. The mobile device 2 may transmit an NFC signal including the current date and time information as the vehicle key transmission request. According to this configuration, the card key 1 can generate the temporary key code based on the date and time information transmitted from the mobile device 2 even though the card key 1 itself does not have a clock function.

There may be a time lag of several minutes to 10 minutes between the time set in the authentication ECU 4 and the time set in the mobile device 2. Among the elements constituting the time information, the values of minutes (mm) and seconds (ss) may differ in different devices. For this reason, the date and time information used to generate the temporary key code includes not only the date but also the time such as 10:00 or 15:00, that is, data indicating YYYY-MM-DDThh. Herein, "YYYY-MM-DD" indicates the date, and "hh" indicates the time. The "T" between "DD" and "hh" is a delimiter.

The temporary key code may be generated using the location coordinates of each device instead of or in parallel with the date and time information. In this case, the card key 1 may obtain location information from the mobile device 2. When the location coordinates has an offset of one second, the distance may have an offset of about 40 meters. When the user uses the vehicle Hv, it is expected that the user is located within 6 meters of the vehicle Hv. Therefore, it is expected that the location information down to the integer second will match between the authentication ECU 4 and the mobile device 2. Therefore, even though location information down to integer second is used to generate the temporary key code, the temporary key code used by the authentication ECU 4 for BLE authentication will match the temporary key code the card key 1 returns to the mobile device 2, and authentication will be successful.

According to the configuration of the fourth modification, the genuine vehicle key code is not transmitted to the mobile device 2, thereby providing higher security than the configurations of first to third modifications. Even though the temporary key code is stolen, the temporary key code may become invalid after a certain time period or may become invalid at a different location. Therefore, the security of the vehicle digital key system Sys can be further improved.

(Fifth Modification)

Figure 9:
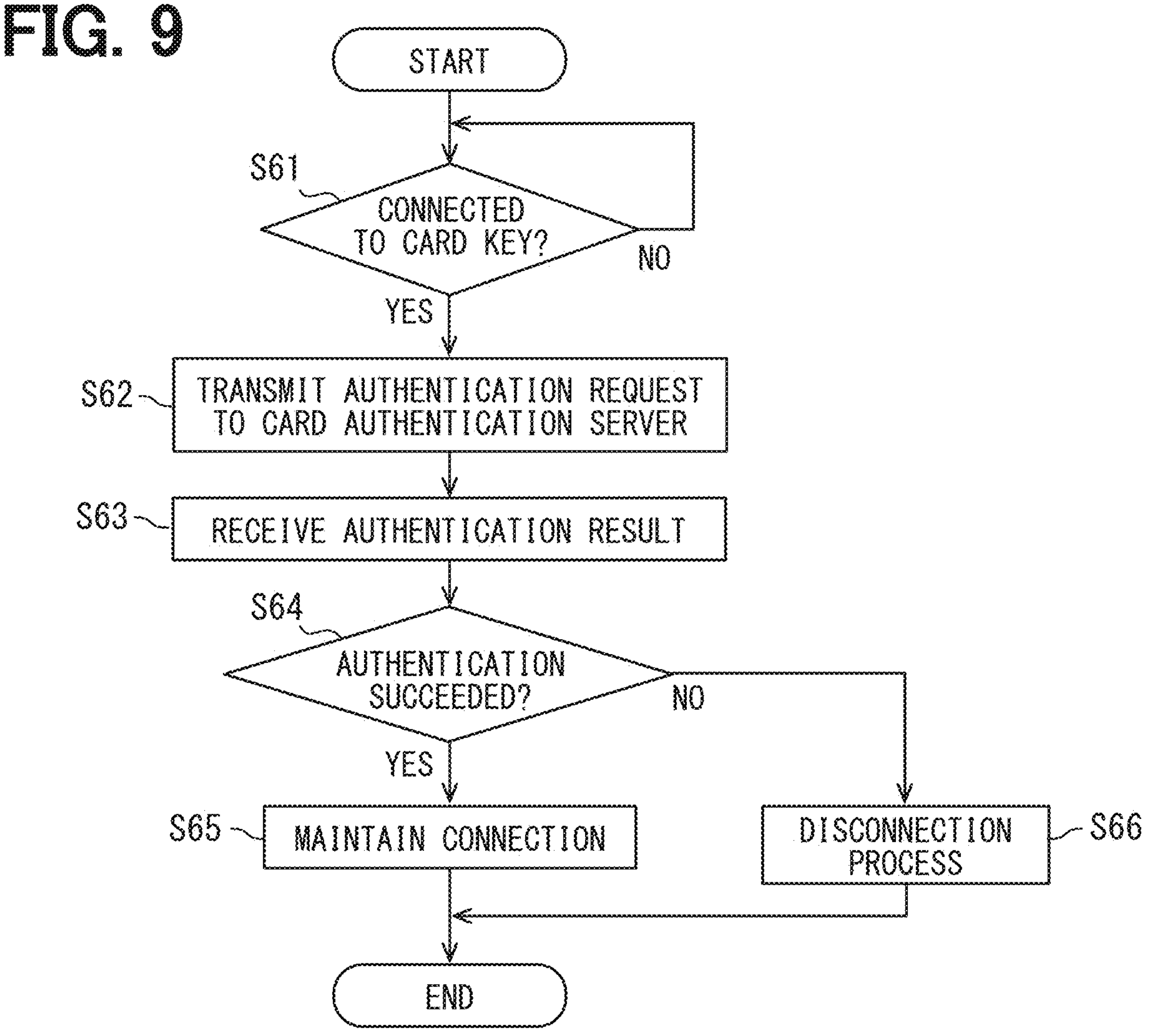
FIG. 9 is a flowchart showing a process in which a mobile device verifies a legitimacy of a communication partner of the mobile device via NFC in cooperation with a card authentication server.

When the card key 1 is a credit card, the mobile device 2 can verify the legitimacy and validity of the credit card by communicating with a card authentication server. The card authentication server is a server managed by a credit card issuing company, and checks the legitimacy and expiration date of the credit card. Based on this idea, when the mobile device 2 becomes capable of performing the NFC communication with the card key 1 as shown in FIG. 9, the mobile device 2 may communicate with a card authentication server to check the legitimacy and expiration date of the card connected via NFC. The card that is communicatively connected via NFC corresponds to a second communication connection device.

In S61 of FIG. 9, the mobile device 2 determines, via NFC, whether a communication connection is established with the credit card functioning as the card key 1. In S62, the mobile device 2 transmits an authentication request to the card authentication server in response to the mobile device 2 being able to communicate with the card key 1 via NFC. The data set transmitted as the authorization request may include a credit card number and expiration date. The transmission of authentication request to the card authentication server may be performed via cellular communication.

In S63, the mobile device 2 receives an authentication result of the credit card from the card authentication server. When the mobile device 2 receives a response from the card authentication server indicating that the authentication is successful (S64: YES), the mobile device 2 maintains the communication connection with the card key 1 in S65. By this configuration, the mobile device 2 can execute the subsequent processes for BLE authentication, such as transmitting a challenge code to the card key 1 and transmitting a vehicle key transmission request.

When the mobile device 2 receives a response from the card authentication server indicating that authentication has failed (S64: NO), the mobile device 2 terminates the communication connection with the card key 1 in S66. In S66, the mobile device 2 may temporarily change the settings so that the subsequent process is not executed, rather than disconnecting the communication.

The authentication of credit card may fail when the credit card itself is a counterfeit, the credit card has expired, or the credit card is invalidated by the card management company. A credit card may be disabled when the credit card has been reported lost or when a suspected fraudulent use of the credit card has been detected.

According to the above configuration, a risk of a third party using the vehicle Hv with a forged, lost, or stolen card key 1 can be reduced. Since the security function of a credit card can be utilized, there is no need to install a new dedicated server for the vehicle digital key system Sys for authentication purpose. Therefore, it is possible to improve security while suppressing increase in system cost.

(Sixth Modification)

Figure 10:
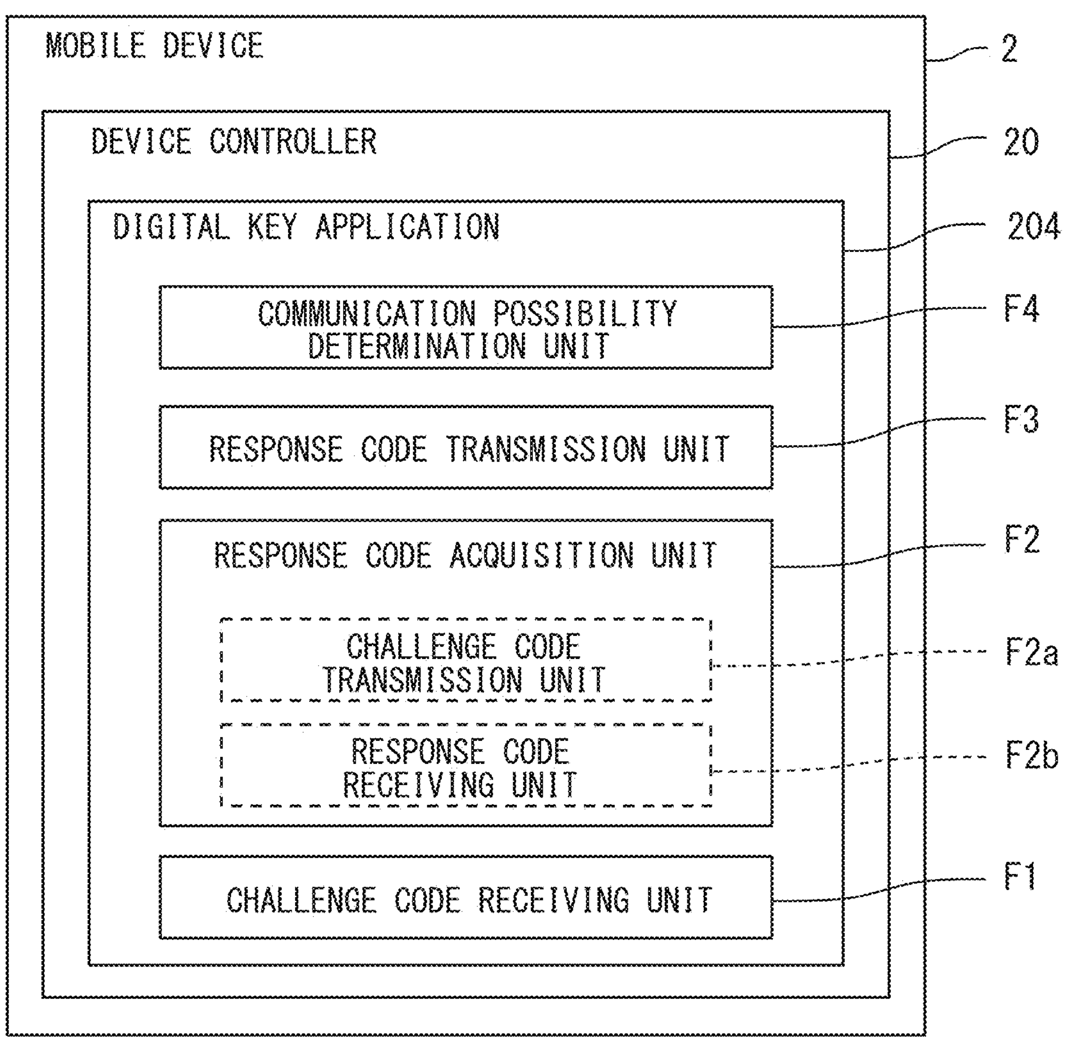
FIG. 10 is a block diagram showing a functional configuration of a mobile device.

As shown in FIG. 10, the mobile device 2 may include a communication possibility determination unit F4 that determines whether a communication with the card key 1 is possible. The state in which the communication with the card key 1 is possible corresponds to a state in which the card key 1 is placed over the card reading portion of the mobile device 2. Whether the communication with the card key 1 is possible can be determined based on whether a polling command or a specific command can be transmitted from the NFC communication unit 24 and a response can be received from the card key 1. Whether the communication with the card key 1 is possible can be managed by a flag, or the like.

Figure 11:
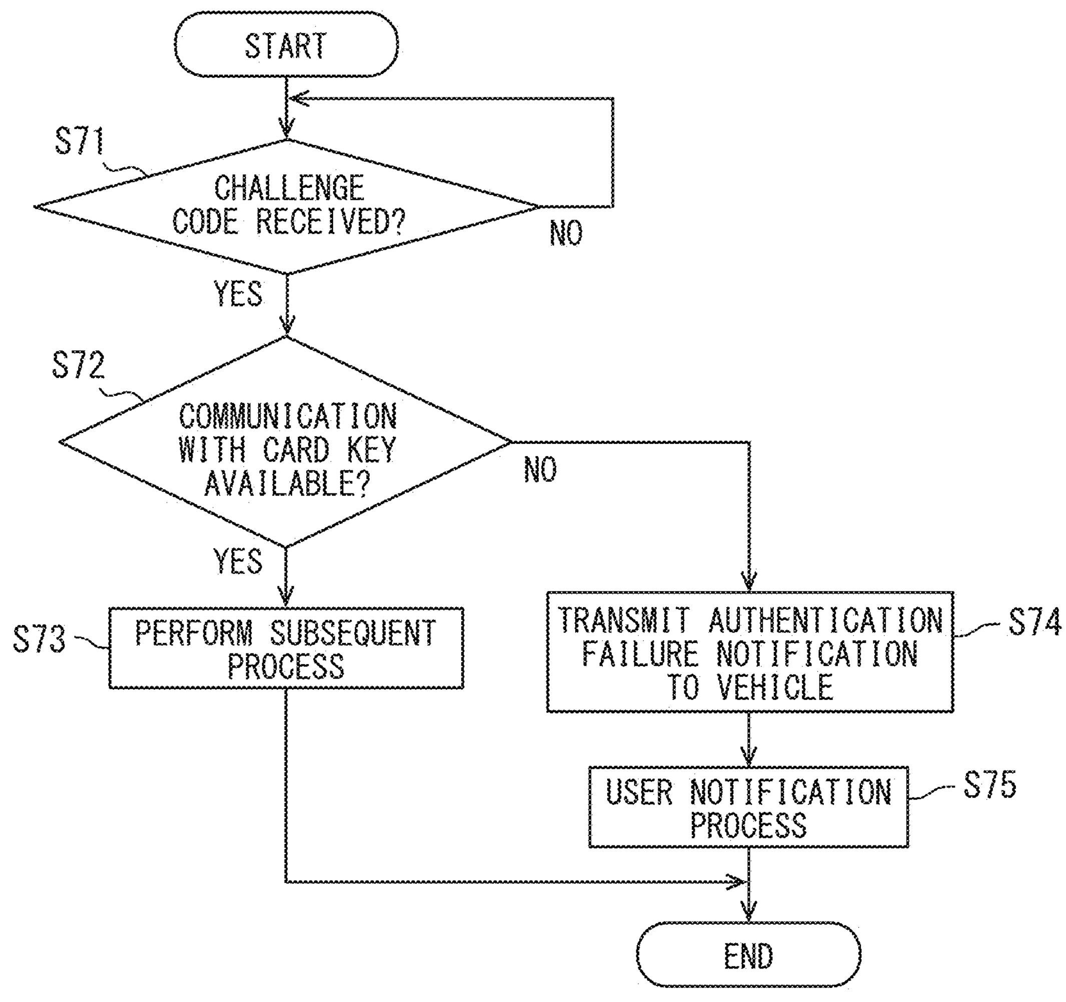
FIG. 11 is a flowchart showing an operation of a mobile device when a communication with the card key is not possible when a challenge code is received.

The mobile device 2 may change a response generated in response to reception of a challenge code, depending on the determination result by the determination unit F4. As shown in FIG. 11, when the mobile device 2 receives a challenge code from the authentication ECU 4 (S71: YES), the determination unit F4 determines whether the communication with the card key 1 is possible in S72. When the mobile device 2 is able to communicate with the card key 1, the mobile device 2 carries out subsequent processes related to obtaining a response code, such as transmitting the challenge code to the card key 1 in S73.

When the mobile device 2 receives the challenge code (S71: YES) but the mobile device is unable to communicate with the card key 1 (S72: NO), the mobile device 2 transmits an authentication failure notification to the authentication ECU 4 in S74. The authentication failure notification is a BLE signal that includes a specific code, such as error code indicating that a response code cannot be returned. The mobile device 2 may both transmit the authentication failure notification in S74 and execute a user notification process in S75.

The user notification process in S75 is a process of notifying the user that the PEPS function is not available and that the user needs to place the card key 1 over the card reading portion of the mobile device 2. The user notification process can be implemented by vibrating, in a predetermined pattern, a vibrator provided in the mobile device 2, outputting a notification sound in a predetermined pattern, or displaying a predetermined message on the display 21. With this configuration, the user can easily notice that he or she has forgotten to place the card key 1 on the mobile device 2.

When the authentication ECU 4 receives a notification indicating that the authentication is failed, the authentication ECU 4 may execute a process of notifying the user that BLE authentication is not possible. The notification may be performed, for example, by displaying an image on the in-vehicle display 67 or by blinking the headlights. When receiving an authentication failure notification from the mobile device 2, the authentication ECU 4 may display a guide image on the in-vehicle display 67 suggesting the use of another authentication method. The authentication ECU 4 may activate the NFC communication device 62 based on receiving the authentication failure notification from the mobile device 2, and then suggest to the user to use NFC authentication. The authentication ECU 4 may activate the biometric authentication sensor 63 based on receiving the authentication failure notification from the mobile device 2, and then suggest to the user to use the biometric for authentication purpose. A notification that notifies the BLE authentication is not possible or a guidance on using another authentication method corresponds to a temporary control.

The authentication ECU 4 may execute a process of suggesting the use of the above-mentioned alternative authentication method not only when the authentication ECU 4 receives the authentication failure notification from the mobile device 2, but also when the authentication ECU 4 detects a user's unlocking operation or a locking operation in a state where the BLE communication connection with the mobile device 2 is not established. This configuration can reduce the risk of the user being confused by the BLE authentication failure or no response to the user's unlocking operation or locking operation. The authentication ECU 4 may be configured to activate an alternative authentication device, such as the NFC communication device 62 or the biometric authentication sensor 63, only when it is determined that the BLE authentication cannot be performed. According to this configuration, power consumption while the vehicle is parked can be reduced.

As shown in FIG. 10, the DK application 204 includes a challenge code receiving unit F1, which is provided by a software program or a hardware circuit. The challenge code receiving unit F1 executes a process to receive a challenge code from the authentication ECU 4 via the BLE communication. The challenge code receiving unit F1 corresponds to a first data receiving unit. The DK application 204 includes a response code acquisition unit F2, which is configured to acquire the response code by communicating with the card key 1. Acquiring of the response code herein includes not only receiving the response code from the card key 1, but also generating the response code using the vehicle key code received from the card key 1. The response code acquisition unit F2 includes a challenge code transmission unit F2*a*, which is a module that executes a process of transmitting the challenge code to the card key 1 via NFC. The challenge code transmission unit F2*a* may be omitted as appropriate depending on the specific configuration, for example, in the configuration of second modification. The challenge code transmission unit F2*a* corresponds to a first data transmission unit. The response code acquisition unit F2 includes a response code receiving unit F2*b*, which is a module that executes a process of receiving the response code from the card key 1 via NFC. The response code receiving unit F2*b* may be omitted as appropriate depending on the specific configuration, for example, in the configuration of second modification. The response code receiving unit F2*b* corresponds to a second data receiving unit. The DK application 204 includes a response code transmission unit F3, which is configured to transmit the response code to the authentication ECU 4 via BLE communication. The response code transmission unit F3 corresponds to a second data transmission unit.

(Seventh Modification)

Figure 12:
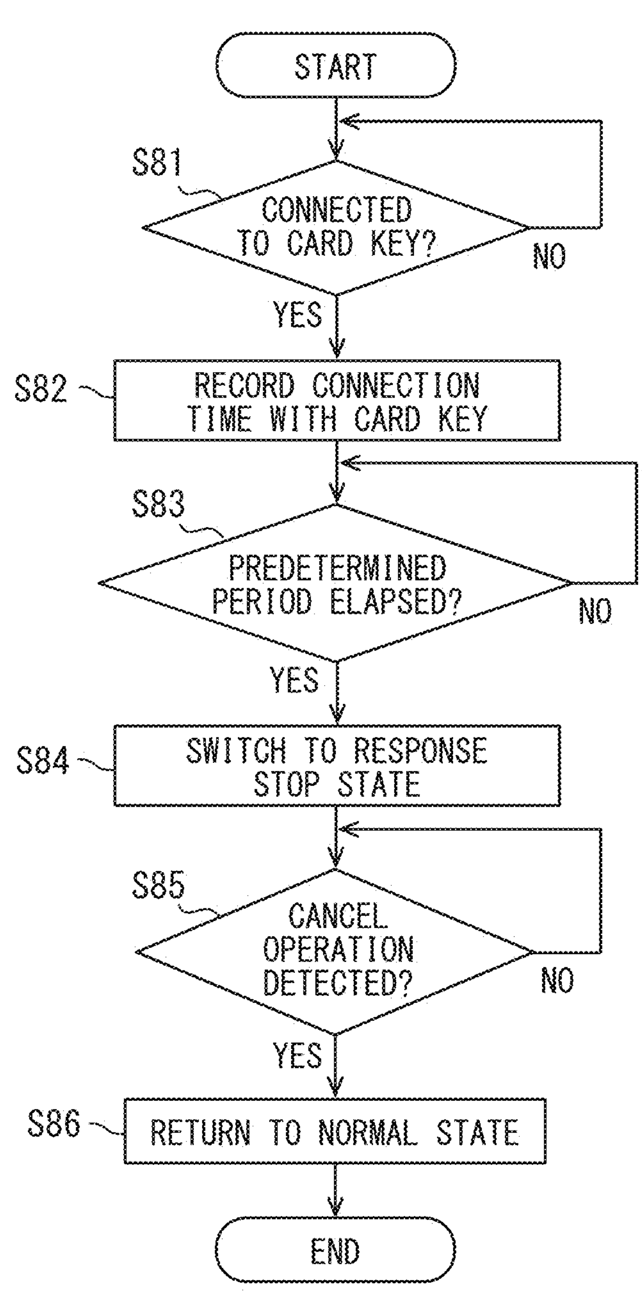
FIG. 12 is a flowchart showing a control mode for switching to a response stop state based also on a connection duration with a card key.

As shown in FIG. 12, the mobile device 2 may be configured to switch to a response stop state. In the response stop state, the mobile device 2 does not return the response code in response to the communication possible state with the card key 1 being continued equal to or longer than a certain period of time. The response stop state corresponds to a state in which the NFC communication function is temporarily stopped, or a state in which the NFC communication function is maintained but the process for obtaining the response code is not executed.

As shown in FIG. 11, when the mobile device 2 is able to communicate with the card key 1 (S81: YES), the mobile device 2 records the time at which the communication with the card key 1 becomes possible as a card connection time in S82. While the state in which the communication with the card key 1 is possible continues, the mobile device 2 determines whether a predetermined response lock period has elapsed from the card connection time in S83. The process executed in S83 corresponds to a step of determining whether a connection maintenance period, which is a duration by which the mobile device 2 continues to be able to communicate with the card key 1, has exceeded a predetermined value.

The response lock period may be set to 5 minutes or 15 minutes, etc. The response lock period may be set to one hour, three hours, etc. The specific value of the response lock period may be freely set by the user via the touch panel 22. A shorter response lock period can provide higher security.

When an elapsed period from the card connection time exceeds the response lock period (S83: YES), the mobile device 2 switches to the response stop state in S84. The mobile device 2 may switch the NFC communication device 62 to an inactive state. The mobile device 2 may terminate or stop communication with the card key 1 in a software manner while keeping the active state of NFC communication device 62.

After switching to the response stop state, when the mobile device 2 detects that a predetermined cancel operation is performed to cancel the response stop state (S85: YES), the mobile device 2 returns to the normal state in S86. The normal state corresponds to a state in which the communication with the card key 1 is possible. The cancel operation may be an operation of selecting a predetermined cancel button provided in the DK application 204, or an operation of placing the card key 1 again over the card reading portion of the mobile device 2. These operations can be detected based on a signal from the touch panel 22 or a signal from the NFC communication unit 24. The cancel operation may also be an act of shaking the mobile device 2. The shaking action can be detected from an output of acceleration sensor provided in the mobile device 2.

According to the above configuration, even though the user places the card key 1 over the card reading portion of the mobile device 2 for a long period of time, the risk of the vehicle Hv being used fraudulently can be reduced.

(Eighth Modification)

In addition to the BLE, various other communication standards can be adopted between the in-vehicle system 3 and the mobile device 2, such as Bluetooth Classic, Wi-Fi (registered trademark), UWB-IR (Ultra Wide Band-Impulse Radio), and EnOcean (registered trademark). The communication method between the in-vehicle system 3 and the mobile device 2 may be a LF-UHF combined method. The LF-UHF combined method is a system for performing two-way communication by using radio waves of LF (Low Frequency) band, such as 125 kHz or 134 kHz, and radio waves of UHF (Ultra radio frequency) band, such as 315 MHz or 920 MHz. The LF-UHF combined method may be a system in which LF band radio waves are used for signal transmission from the in-vehicle system 3 to the mobile device 2, and UHF band radio waves are used for signal transmission from the mobile device 2 to the in-vehicle system 3.

The mobile device 2 and the in-vehicle system 3 may be configured to be capable of performing a short range communication. Here, the short range communication refers to a communication method in which an actual communication distance is 0.5 meters or more, and is approximately 1 meter, 10 meters, 20 meters, or 100 meters. The above-described BLE, Wi-Fi, and other communication methods correspond to communication methods for implementing the short range communication. The term BLE communication in the above embodiments can be replaced with UWB communication, Wi-Fi communication, short range communication, or the like. The communication distance is the maximum distance over which the communication can be performed, and therefore may also be referred to as a maximum communication distance.

(Ninth Modification)

In the above embodiments, a credit card is used as the key module. The implementation of key module is not limited to the credit card. The key module may be an IC card equipped with an NFC function other than a credit card. The key module may have a form other than a card, such as a tag, a key ring, key chain (also referred to as a key holder), or a strap. The key module may be a wearable device, such as a finger ring or a wristband. MNFC is understood as a type of electromagnetic induction/passive RFID (radio frequency identification). The card key 1 may also be referred to as NFC tag or an RFID tag. The communication method between the card key 1 and the mobile device 2 corresponds to a second communication method. The second communication method is a method in which the communication distance is less than 0.5 meters, or less than 0.1 meters. The shorter the communication distance, an inadvertent communication between the card key 1 and the mobile device 2 can be decreased, thereby improving the communication security. The second communication method may be infrared communication. The second communication method may be human body communication. The key module may be a device, accessory, a tool, which does not have cellular communication function, for reducing the risk of the vehicle key code being stolen or leaked by hacking or virus infection. The vehicle key code stored in the key module and the vehicle key code stored in the authentication ECU 4 only need to be associated with one other for matching purpose, and do not necessarily have to be the identical value. The first key code and the second key code may have different values, provided that they are associated with one other. The conditions for determining whether the authentication is successful may be designed according to the characteristics of the key code.

(Tenth Modification)

The vehicle Hv may be a company vehicle owned by a company organization or an official vehicle owned by a public institution. When the vehicle Hv is a company vehicle or an official vehicle, the user may be a person belonging to an organization that manages the vehicle Hv. The vehicle Hv may be a vehicle provided for a rental service (referred to as a rental car) or a vehicle provided for a car-sharing service (referred to as a shared car). When the vehicle Hv is a vehicle provided for the above services (hereinafter referred to as a service vehicle), a person who has a contract to use a service and who has an authority to temporarily use the vehicle Hv based on reservation of the service corresponds to the user. The present disclosure is applicable not only to vehicles but also to electronic key system for buildings and facilities.

The flowcharts shown in the present disclosure are examples, and the number of processes constituting the flowcharts and the execution order of the processes can be changed as appropriate. The device, the system and the method therefor described in the present disclosure may be implemented by a dedicated computer which constitutes a processor programmed to perform one or more functions by executing computer programs. The device and the method described in the present disclosure may be also implemented by a dedicated hardware logic circuit. The device and the method described in the present disclosure may be also implemented by one or more dedicated computers which are constituted by combinations of a processor for executing computer programs and one or more hardware logic circuits. As the processor (arithmetic core), a CPU, an MPU, a GPU, a DFP (Data Flow Processor), or the like can be adopted. Some or all of the functions of the mobile device 2 and the authentication ECU 4 may be implemented using a system-on-chip (SoC), an IC, or a field-programmable gate array (FPGA). The IC in the present disclosure also includes ASIC (Application Specific Integrated Circuit). The computer program executed by each device described in the present disclosure may be stored in a computer-readable non-transitory tangible storage medium as instructions to be executed by a computer. As a storage medium for storing the computer program, a hard disk drive (i.e., HDD), a solid state drive (i.e., SSD), a flash memory, or the like can be adopted. The scope of the present disclosure also includes programs for causing a computer to function as the mobile device 2, the authentication ECU 4, card key 1, non-transitory tangible storage mediums such as semiconductor memories which store the above-described programs, and other aspects. The present disclosure also includes a credit card provided with a storage area in which the vehicle key code can be written, and an NFC writer configured to be able to write the vehicle key code in the credit card.

What is claimed is:

1. A user authentication method comprising:

transmitting, from an authentication unit, first data for authenticating a user, to a digital key application installed in a mobile device by performing a first communication, wherein the authentication unit is configured to perform the first communication with the mobile device and including a first storage device in which a first key code for authenticating the user is stored, the mobile device is installed with the digital key application and is configured to perform the first communication, which is a wireless communication method having a communication distance of 0.5 meters or longer, and a second communication, which is a wireless communication method having a communication distance shorter than the communication distance of the first communication;

acquiring, by the digital key application, second data from a key module by performing the second communication with the key module in response to the first data being received by the digital key application via the first communication, wherein the key module is configured to perform the second communication with the mobile device and includes a second storage device in which a second key code is stored, the second key code has a value same as a value of the first key code or the second key code is associated with the first key code, and the key module generates the second data based on the first data using the second key code stored in the second storage device;

transmitting, by the digital key application, the second data to the authentication unit by performing the first communication with the authentication unit; and authenticating, by the authentication unit, the user using the second data transmitted from the digital key application.

2. The user authentication method according to claim 1, wherein the acquiring of the second data by the digital key application includes:

in response to the first data transmitted from the authentication unit being received by the digital key application, transmitting a data set including the first data from the digital key application to the key module via the second communication;

in response to the first data transmitted from the digital key application being received by the key module, generating the second data based on the first data using the second key code and returning the generated second data via the second communication; and receiving, by the digital key application, the second data returned from the key module via the second communication.

3. The user authentication method according to claim 1, wherein the acquiring of the second data by the digital key application includes:

in response to the first data transmitted from the authentication unit being received by the digital key application, transmitting, from the digital key application to the key module, a key request signal requesting transmission of the second key code via the second communication;

in response to the key module receiving the key request signal from the digital key application, transmitting the second key code from the key module to the digital key application via the second communication; and generating, by the digital key application, the second data based on the first data using the second key code transmitted from the key module via the second communication.

4. The user authentication method according to claim 3, wherein the digital key application deletes, from the mobile device, the second key code received via the second communication immediately after the second data is generated.

5. The user authentication method according to claim 1, further comprising:

detecting, by the digital key application, a predetermined overlap operation performed by the user based on a signal output from a sensor equipped to the mobile device; and connecting a communication, by the digital key application, with the key module in response to the predetermined overlap operation performed by the user being detected.

6. The user authentication method according to claim 1, further comprising:

determining whether the digital key application is able to communicate with the key module;

in a case where the digital key application is not able to communicate with the key module when the digital key application receives the first data from the authentication unit, returning, from the digital key application to the authentication unit, a signal including a predetermined error code via the first communication; and performing, by the authentication unit, a predetermined temporary control in response to receiving the signal including the predetermined error code from the digital key application.

7. The user authentication method according to claim 1, wherein the authenticating of the user includes:

generating, by the authentication unit, third data based on the first data, which is transmitted to the digital key application, using the first key code in a method same as a generation method of the second data; and performing, by the authentication unit, the authenticating of the user by comparing the generated third data with the received second data.

8. The user authentication method according to claim 1, further comprising:

performing, by the digital key application, a communication with a predetermined server to verify a legitimacy of the key module, which is connected to the digital key application via the second communication; and starting a process of acquiring the second data by the digital key application under a condition that the legitimacy of the key module is verified by the server.

9. The user authentication method according to claim 8, wherein, in response to the legitimacy of the key module being not verified by the server, the digital key application does not execute the process of acquiring the second data.

10. The user authentication method according to claim 1, further comprising:

counting, by the digital key application, a connection maintenance period, which is an elapsed time from when the digital key application starts the second communication with the key module; and switching, the digital key application, to a response stop state in which the digital key application does not transmit the second data to the authentication unit, in response to the connection maintenance period exceeding a predetermined response lock period.

11. The user authentication method according to claim 10, further comprising:

detecting, by the digital key application, an unlocking operation performed by the user based on an input signal from a sensor mounted on the mobile device; and resetting the response stop state of the digital key application to a normal state in response to the unlocking operation being detected.

12. The user authentication method according to claim 1, wherein the first communication is one of Bluetooth (registered trademark) Low Energy, Bluetooth Classic, Wi-Fi, Ultra Wide Band-Impulse Radio, EnOcean, or LF-UHF combined method, and the second communication is near field communication (NFC).

13. The user authentication method according to claim 1, wherein the key module is a credit card.

14. A user authentication digital key system comprising:

a digital key application installed in a mobile device, which is capable of performing a first communication and a second communication, the first communication being a wireless communication method having a communication distance of 0.5 meters or longer, and the second communication being a wireless communication method having a communication distance shorter than the communication distance of the first communication; and a key module configured to communicate with the mobile device via the second communication, wherein the digital key application includes:

a first data receiving unit receiving first data, which is transmitted from an authentication unit, via the first communication for user authentication purpose; and a first data transmission unit transmitting a data set including the first data to the key module via the second communication in response to the first data being received by the first data receiving unit via the first communication, the key module includes:

a module storage unit in which a key code for user authentication purpose is stored; and a response circuit generating second data based on the first data using the key code stored in the module storage unit in response to the first data transmitted from the digital key application being received via the second communication, and the response circuit returning the generated second data to the digital key application via the second communication, and the digital key application further includes:

a second data receiving unit receiving the second data returned from the key module via the second communication; and a second data transmission unit transmitting the second data to the authentication unit via the first communication.

15. The user authentication digital key system according to claim 14, wherein the first communication is one of Bluetooth (registered trademark) Low Energy, Bluetooth Classic, Wi-Fi, Ultra Wide Band-Impulse Radio, EnOcean, or LF-UHF combined method, and the second communication is near field communication (NFC).

16. The user authentication digital key system according to claim 14, wherein the key module is a credit card.

17. A mobile device program product stored in a computer-readable non-transitory storage medium, the mobile device program product comprising instructions to be executed by at least one processor included in a mobile device for performing authentication of a user, the instructions comprising:

receiving first data, which is transmitted from an authentication unit, via a first communication for user authentication, wherein the mobile device is capable of performing the first communication, which is a wireless communication method having a communication distance of 0.5 meters or longer, and a second communication, which is a wireless communication method having a communication distance shorter than the communication distance of the first communication;

in response to receiving the first data transmitted from the authentication unit via the first communication, performing the second communication with a key module, in which a key code used for the user authentication is stored, to acquire the key code;

generating second data based on the first data using the acquired key code; and transmitting the second data to the authentication unit via the first communication.

18. The mobile device program product according to claim 17, wherein the first communication is one of Bluetooth (registered trademark) Low Energy, Bluetooth Classic, Wi-Fi, Ultra Wide Band-Impulse Radio, EnOcean, or LF-UHF combined method, and the second communication is near field communication (NFC).

19. The mobile device program product according to claim 17, wherein the key module is a credit card.

* * * * *